(12) United States Patent
Mori et al.

(10) Patent No.: US 8,117,836 B2
(45) Date of Patent: Feb. 21, 2012

(54) SCROLL TYPE FLUID MACHINE AND AIR SUSPENSION APPARATUS USING THE SAME

(75) Inventors: Shunsuke Mori, Kanagawa (JP); Kazutaka Suefuji, Kanagawa (JP)

(73) Assignee: Hitachi, Ltd., Tokyo (JP)

( * ) Notice: Subject to any disclaimer, the term of this patent is extended or adjusted under 35 U.S.C. 154(b) by 682 days.

(21) Appl. No.: 12/285,036

(22) Filed: Sep. 29, 2008

(65) Prior Publication Data

US 2009/0085312 A1 Apr. 2, 2009

(30) Foreign Application Priority Data

Sep. 28, 2007 (JP) ................................. 2007-256749

(51) Int. Cl.
*F25B 9/06* (2006.01)
*F02G 5/00* (2006.01)
(52) U.S. Cl. ........................................ 60/409; 418/55.1
(58) Field of Classification Search .................... 60/409; 418/55.1

See application file for complete search history.

(56) References Cited

U.S. PATENT DOCUMENTS

| 4,836,511 | A | * | 6/1989 | Buma et al. | 267/64.16 |
| 5,484,162 | A | * | 1/1996 | Kanoh et al. | 417/278 |
| 6,173,974 | B1 | * | 1/2001 | Raad et al. | 280/6.157 |
| 2003/0068246 | A1 | * | 4/2003 | Kimura et al. | 418/55.4 |

OTHER PUBLICATIONS

JIII Journal of Technical Disclosure (Kokai Giho) 2006-504219, Japan Institute of Invention and Innovation (Jul. 31, 2006).*
JIII Journal of Technical Disclosure (*Kokai Giho*) 2006-504219, Japan Institute of Invention and Innovation (Jul. 31, 2006).

* cited by examiner

*Primary Examiner* — Thomas E Lazo
(74) *Attorney, Agent, or Firm* — Rader, Fishman & Grauer PLLC

(57) ABSTRACT

A pressure keeping mechanism is provided downstream of a discharge port of a compressor. The pressure keeping mechanism is set to a small flow path area having only a bypass orifice until a pressure in a downstream pipe reaches a predetermined pressure after the operation is started, the pressure keeping mechanism is set to a large flow path area of a pressure keeping valve which is opened when the pressure exceeds the predetermined pressure and the bypass orifice, thereby changing the flow path area at least in two stages. The pressure in the upstream pipe which is almost closed by the pressure keeping valve can be thus increased at a dash and the pressure in a compression chamber can also be increased swiftly immediately after the compressor is started.

19 Claims, 17 Drawing Sheets

SCROLL TYPE FLUID MACHINE AND AIR SUSPENSION APPARATUS USING THE SAME

BACKGROUND OF THE INVENTION

1. Field of the Invention

The present invention relates to a scroll type fluid machine which discharges compressed fluid, and to an air suspension apparatus using the same.

2. Description of the Related Art

There are several ways to prevent an orbiting scroll of a scroll type fluid machine from rattling at the beginning of operation, when the pressure between the orbiting and fixed scrolls is not high enough to press the scrolls away from each other. One such way employs magnets which are provided between opposed surfaces of an orbiting scroll and a fixed scroll. During actuation, the orbiting scroll orbits with respect to the fixed scroll, and the magnetic force between the opposed magnets prevents the orbiting scroll from rattling (see Hatsumei Kyokai Kokai Giho No. 2006-504219 for example).

Rattling should be reduced, since it could lessen the lifetime of each scroll due to contact and wearing.

Accordingly, it is an object of the present invention to provide a scroll type fluid machine and an air suspension apparatus using the same capable of enhancing the lifetime of a scroll by stably orbiting the scroll at the time of actuation when a compressing operation is started.

SUMMARY OF THE INVENTION

According to the present invention, a flow path area of a pressure keeping mechanism provided downstream of a discharge port can be changed to at least two levels, a small flow path area is set until a pressure upstream of the pressure keeping mechanism reaches a predetermined upstream pressure after a compressing operation is started, and the flow path area is permitted to be changed to a large flow path area after the pressure exceeds the predetermined upstream pressure.

According to the present invention, it is possible to stably orbiting the orbiting scroll at the time of actuation when the compressing operation is started, and to suppress the contact and wearing to enhance the lifetime of each scroll.

DESCRIPTION OF THE PREFERRED EMBODIMENTS

A scroll type fluid machine according to an embodiment of the present invention will be explained with reference to the accompanying drawings based on a scroll type air compressor as an example.

FIGS. 1 to 4 show a first embodiment of the invention. In the first embodiment, an air suspension apparatus using the scroll type air compressor will be explained.

Figure 1:
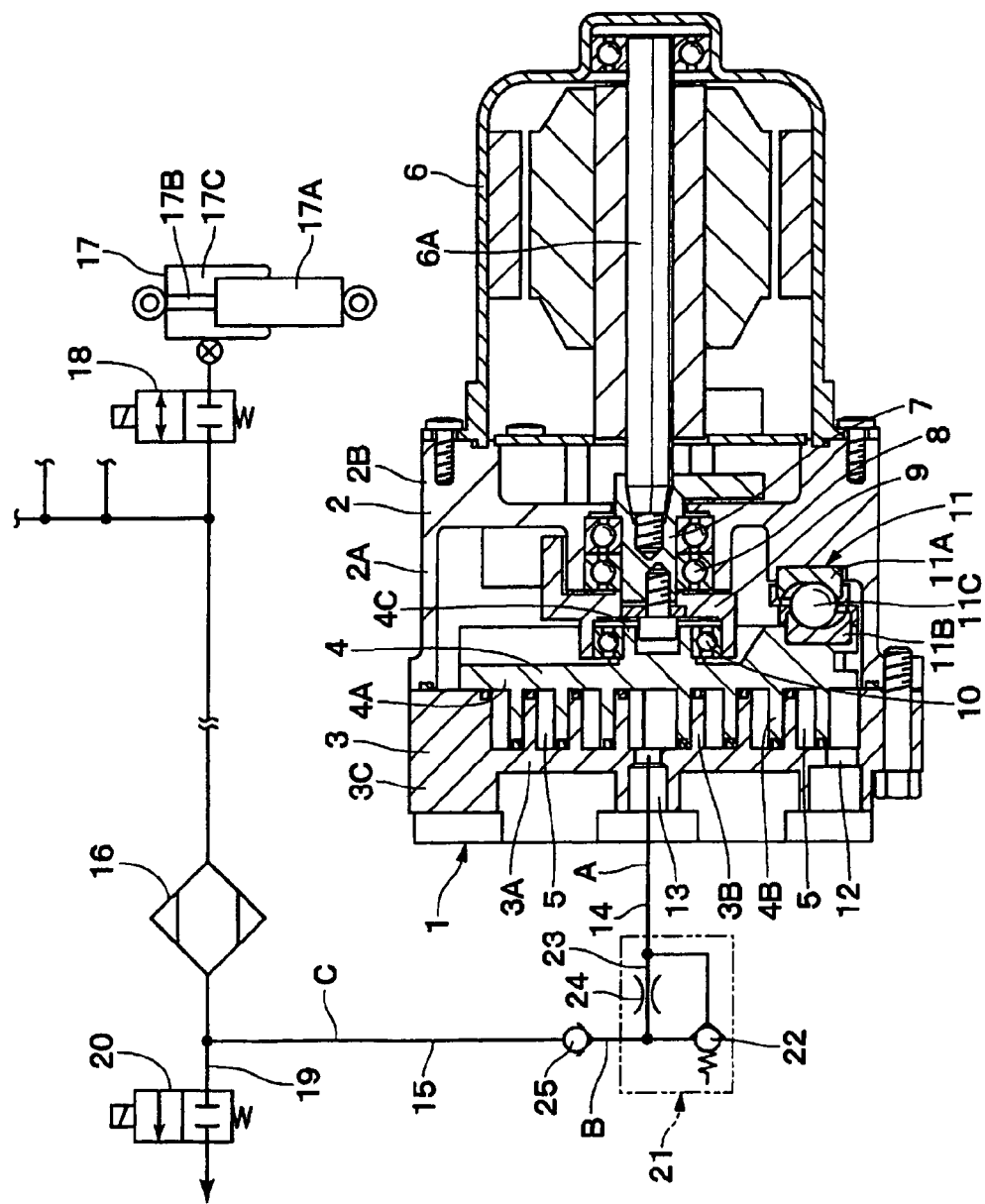
FIG. 1 is a diagram showing an entire structure of an air suspension apparatus and pipes according to a first embodiment of the present invention.

In FIG. 1, a reference numeral 1 denotes a scroll type air compressor (hereinafter referred to as compressor 1) constituting a portion of the air suspension apparatus. The compressor 1 compresses air sucked from outside and discharges the compressed air toward an air suspension 17 which will be described later.

A structure of the compressor 1 will be explained here. A reference numeral 2 denotes a casing forming an outer shell of the compressor 1. The casing 2 is formed into a bottomed cylindrical body including a cylindrical portion 2A and a bottom 2B which is one closed side of the cylindrical portion 2A in the axial direction, with the other side of the cylindrical portion 2A in the axial direction opened.

A reference numeral 3 denotes a fixed scroll fixed to the other side of the cylindrical portion 2A of the casing 2. The fixed scroll 3 includes a disk-like end plate 3A, a spiral wrap portion 3B extending from a surface of the end plate 3A in the axial direction, and a cylindrical support portion 3C provided at an outer peripheral side of the end plate 3A so as to surround the wrap portion 3B from outside.

A reference numeral 4 denotes an orbiting scroll orbitably provided in the casing 2 at a position opposed to the fixed scroll 3. The orbiting scroll 4 includes a disk-like end plate 4A, a spiral wrap portion 4B extending from a surface of the end plate 4A toward the end plate 3A of the fixed scroll 3 in the axial direction, and a boss portion 4C which projects from a central portion of a rear surface of the end plate 4A and to which a rotary shaft 7, which will be described later, is coupled.

The wrap portion 4B of the orbiting scroll 4 overlaps with the wrap portion 3B of the fixed scroll 3 such that the positions are deviated by 180° from each other, for example. A plurality of compression chambers 5 are defined between the wrap portions 3B and 4B.

A reference numeral 6 denotes an electric motor 6 mounted on the bottom 2B of the casing 2, and the later-described rotary shaft 7 is coupled to an output shaft 6A of the electric motor 6. The output shaft 6A rotates to orbit the orbiting scroll 4 through the rotary shaft 7 and a driving bush 9. The reference numeral 7 denotes the rotary shaft mounted on a tip end of the output shaft 6A of the electric motor 6. The rotary shaft 7 is rotatably provided on the casing 2 through a bearing 8.

A reference numeral 9 denotes the stepped cylindrical driving bush mounted on a tip end of the rotary shaft 7. The driving bush 9 places the center of the orbiting scroll 4 at a position eccentric from the rotation center of the rotary shaft 7 by a predetermined value. The driving bush 9 is coupled to the boss portion 4C of the orbiting scroll 4 through an orbit bearing 10. With this, when the rotary shaft 7 is rotated by the electric motor 6, the driving bush 9 cooperates with a thrust receiving mechanism 11, which will be described later, to cause the orbiting scroll 4 to orbit.

A reference numeral 11 denotes a plurality of (e.g., three) thrust receiving mechanisms (only one of them is illustrated) provided between the casing 2 and the back surface of the orbiting scroll 4. These thrust receiving mechanisms 11 are constituted as ball coupling mechanisms which prevents the orbiting scroll 4 from rotating by causing a ball 11C to roll between support members 11A and 11B, and receives the thrust load applied from the compression chamber 5 to the orbiting scroll 4 to support the end plate 4A in the thrust direction. The thrust receiving mechanisms 11 have such a structure that a gap formed in the thrust direction between the end plates 3A, 4A and the wrap portions 4B, 3B can be varied by a predetermined amount to prevent galling.

Each thrust receiving mechanism 11 includes the casing-side support member 11A which is provided on the casing 2 and which is formed with an annular ball guide groove, the scroll-side support member 11B which is provided on the orbiting scroll 4 so as to face the casing-side support member 11A and which is formed with an annular ball guide groove, and the ball 11C held between the ball guide groove of the casing-side support member 11A and the ball guide groove of the scroll-side support member 11B.

A reference numeral 12 denotes an intake port provided on the outer diameter side of the fixed scroll 3. The intake port 12 is in communication with the compression chamber 5 on the outer diameter side defined between the scrolls 3 and 4, and outside air is drawn into the compression chamber 5 through the intake port 12.

A reference numeral 13 denotes a discharge port provided at the center of the fixed scroll 3. The discharge port 13 is in communication with the high pressure compression chamber 5 located at the center, and discharges compressed air from the compression chamber 5 to the outside. The discharge port 13 is connected to the air suspension 17 through an upstream pipe 14, a downstream pipe 15, an air dryer 16 and a supply/discharge valve 18, which will be described later.

Next, pipes and devices connected to the downstream side of the discharge port 13 of the compressor 1 will be explained.

First, the upstream pipe 14 and the downstream pipe 15 will be explained. A reference numeral 14 denotes the upstream pipe connecting the discharge port 13 and a pressure keeping mechanism 21 which will be described later. A reference numeral 15 denotes the downstream pipe provided downstream of the pressure keeping mechanism 21. The downstream pipe 15 is branched into four pipes, for example, through the later-described air dryer 16, and the four pipes are respectively connected to an air chamber 17C of the later-described air suspension 17. The upstream pipe 14 and the downstream pipe 15 supply compressed air discharged from the compressor 1 to the air suspension 17. The pressure keeping mechanism 21 is provided between the upstream pipe 14 and upstream side of the air dryer 16 of the downstream pipe 15.

In the downstream pipe 15, the supply/discharge valve 18 is provided between the air dryer 16 and the air suspension 17. The downstream pipe 15 is branched to connect a discharge pipe 19 between the pressure keeping mechanism 21 and the air dryer 16, and the discharge pipe 19 is provided with a discharge valve 20 which will be described later.

Next, structures of the air dryer 16, the air suspension 17, the supply/discharge valve 18 and the discharge valve 20 provided in the upstream pipe 14 and the downstream pipe 15 will be explained.

A reference numeral 16 denotes the air dryer provided at an intermediate portion of the downstream pipe 15. The air dryer 16 removes moisture included in compressed air discharged from the compressor 1 by means of moisture absorbent (not shown) provided in the air dryer 16, and supplies the dry compressed air to the later-described air suspension 17. The air dryer 16 removes moisture from the moisture absorbent by dry air which reversely flows from the air suspension 17 so that the moisture absorbent can be reused.

A reference numeral 17 denotes a plurality of air suspensions (only one of them is illustrated) as pneumatic devices mounted on a vehicle (not shown). Each of the air suspensions 17 is provided between an axle side and a vehicle body side (both not shown). In the case of a four-wheeled vehicle, for example, a total of four air suspensions 17 are provided, two on the side of the front wheels and two on the side of the rear wheels. Each of the air suspensions 17 is formed with the air chamber 17C between a cylinder 17A and a piston rod 17B. An end of the downstream pipe 15 is connected to the air chamber 17C through the later-described supply/discharge valve 18.

A reference numeral 18 denotes the supply/discharge valve 18 which is located near the air suspension 17 and provided on the side of the end of the downstream pipe 15. The supply/discharge valve 18 is for supplying and discharging compressed air to and from the air suspension 17 through the air dryer 16. If necessary, the supply/discharge valve 18 can also be used as a check valve which prevents compressed air in the downstream pipe 15 from reversely flowing.

Here, the air suspension 17 opens the supply/discharge valve 18 to cause compressed air to flow from the compressor 1 through the upstream pipe 14, the downstream pipe 15 and the air dryer 16 into the air chamber 17C, thereby extending the piston rod 17B to increase the vehicle height. If the air is discharged from the air chamber 17C, the piston rod 17B can be shrunk and the vehicle height can be reduced.

A reference numeral 19 denotes the discharge pipe which is located between the pressure keeping mechanism 21 and the air dryer 16 and which is branched from the downstream pipe 15 and connected thereto. A reference numeral 20 denotes the discharge valve provided in the discharge pipe 19. The discharge valve 20 is normally closed, and is opened only when air returning from the air suspension 17 is discharged to lower the vehicle height.

Next, the pressure keeping mechanism 21 provided for increasing the pressure in the compression chamber 5 of the compressor 1 in a short time will be explained.

A reference numeral 21 denotes the pressure keeping mechanism according to the first embodiment provided downstream of the discharge port 13 of the compressor 1. The pressure keeping mechanism 21 has a small flow path area until a pressure in the downstream pipe 15 downstream of the pressure keeping mechanism 21 reaches a predetermined downstream pressure, which will be described later, after the compressor 1 starts the compressing operation, and has a large flow path area when the pressure exceeds the predetermined downstream pressure. The pressure keeping mechanism 21 includes a pressure keeping valve 22, a bypass pipe 23, and a bypass orifice 24, which will be described later. With this, the pressure keeping mechanism 21 can change the flow path area through which compressed air supplied from the compressor 1 toward the air suspension 17 at least in two stages by opening and closing operation of the pressure keeping valve 22.

Figure 2:
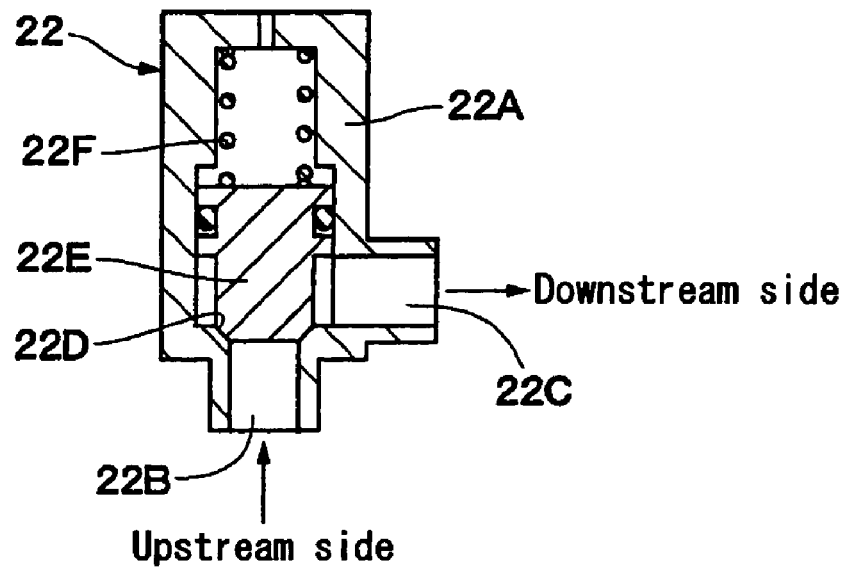
FIG. 2 is an enlarged sectional view of a pressure keeping valve in its closed state.
Figure 3:
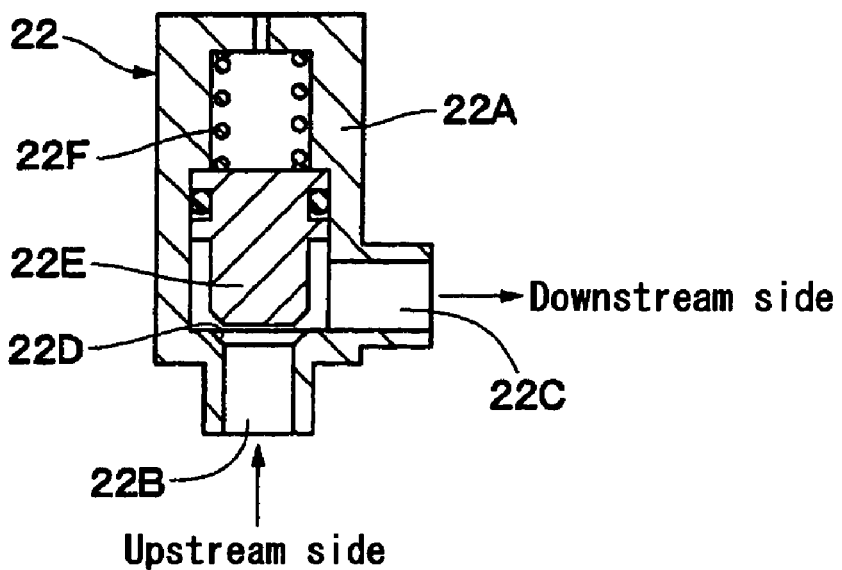
FIG. 3 is an enlarged sectional view of the pressure keeping valve in its open state.

A reference numeral 22 denotes the pressure keeping valve constituting the pressure keeping mechanism 21. The pressure keeping valve 22 is provided between the upstream pipe 14 and the downstream pipe 15. As shown in FIGS. 2 and 3, the pressure keeping valve 22 includes a valve case 22A, an inflow port 22B which is provided in the valve case 22A and to which the upstream pipe 14 is connected, an outflow port 22C which is also provided in the valve case 22A and to which the downstream pipe 15 is connected, a valve seat 22D provided between the inflow port 22B and the outflow port 22C in the valve case 22A, a valve body 22E which separates from and seats on the valve seat 22D to bring the ports 22B and 22C into communication and out of communication with each other, a valve spring 22F which biases the valve body 22E toward the valve seat 22D, and a vent port 22G which is opened to atmosphere.

Figure 4:
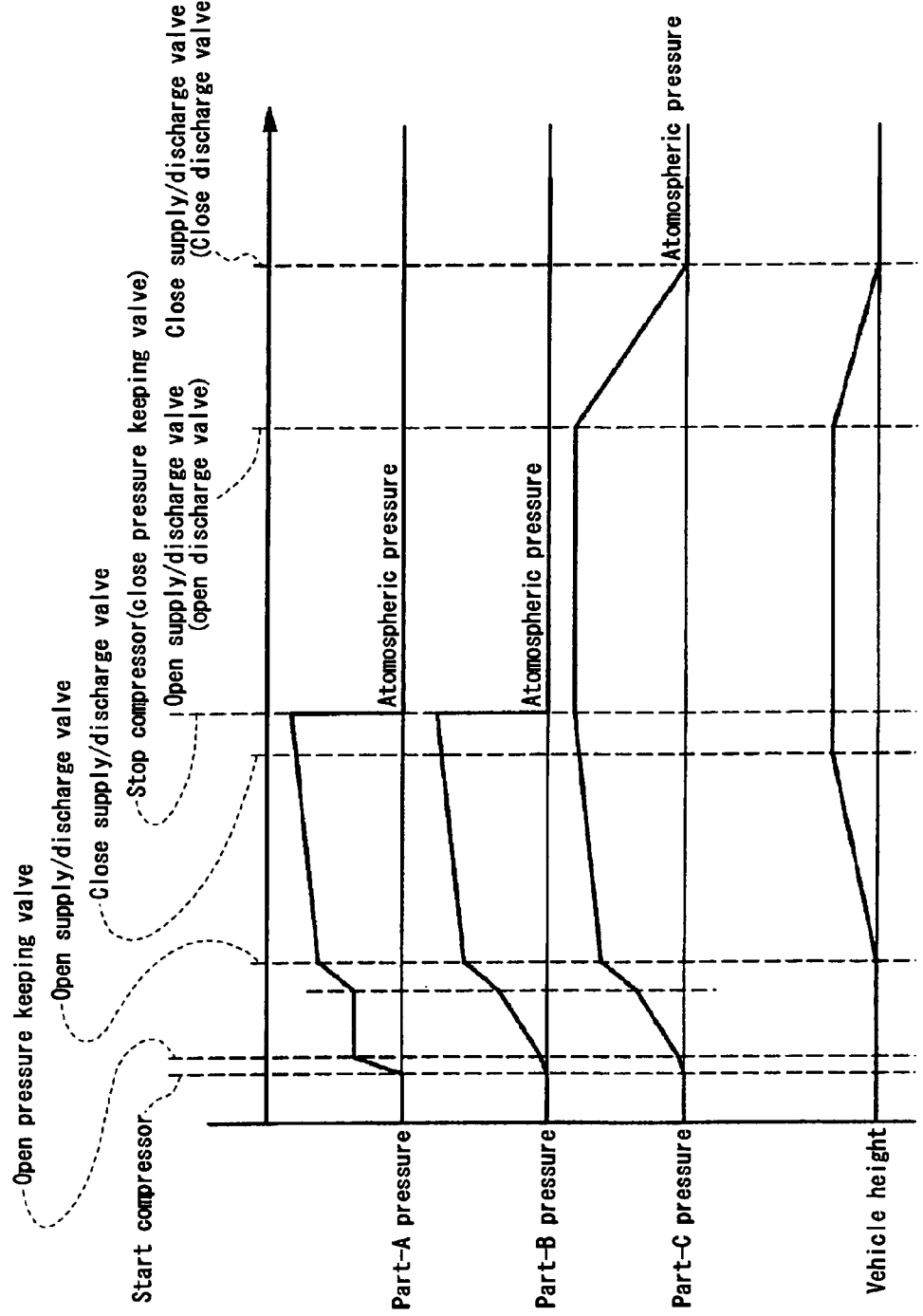
FIG. 4 is a time chart showing pressure variation in upstream and downstream pipes and open/close timing of the pressure keeping valve and a supply/discharge valve shown in FIG. 1.

When the compressor 1 is stopped or immediately after the compressor 1 is started and the pressure in the upstream pipe 14 is low as shown in FIG. 4, the valve body 22E seats on the valve seat 22D by a biasing force of the valve spring 22F to bring the ports 22B and 22C out of communication with each other as shown in FIG. 2. If the pressure in the upstream pipe 14 is increased, the valve body 22E is separated from the valve seat 22D in accordance with the pressure rise, and the opening degree (flow path area) is changed from a small value to a large value so as to keep the pressure in the upstream pipe 14 constant. If the pressure in the upstream pipe 14 is further increased, as shown in FIG. 3, the valve body 22E is fully opened. The state where the valve body 22E is separated (this is not limited to the fully opened state) constitutes the large flow path area of the pressure keeping mechanism 21.

Here, the predetermined pressure according to the first embodiment for opening the pressure keeping valve 22 will be explained. This predetermined pressure is set to such a sufficient value that a pressure at the discharge port 13, and therefore a pressure in the compression chamber 5 stably orbit the orbiting scroll 4. A spring force of the valve spring 22F is set to such a value that the valve body 22E is fully opened by this predetermined pressure or higher. If the pressure is set to this value, the pressure in the upstream pipe 14 is kept constant until it becomes equal to the pressure in the downstream pipe 15 and thus, the pressure in the downstream pipe 15 can rise sufficiently quickly. The spring force of the valve spring 22F may be set to such a value that the valve body 22E is fully opened by a pressure smaller than the predetermined pressure. In this case, since the pressure in the upstream pipe 14 cannot be released to the downstream pipe 15 even when the valve body 22E is fully opened, the pressure in the upstream pipe 14 rises at a faster speed than the pressure rise in the downstream pipe 15 until the pressure in the upstream pipe 14 becomes equal to that in the downstream pipe 15. That is, the same pressure change as that when an orifice is provided between the upstream pipe 14 and the downstream pipe 15 is exhibited.

A reference numeral 23 denotes the bypass pipe which bypasses the pressure keeping valve 22 and connects the upstream pipe 14 and the downstream pipe 15 with each other. A reference numeral 24 denotes the bypass orifice provided in the bypass pipe 23. The bypass orifice 24 constitutes a small flow path area of the pressure keeping mechanism 21. That is, the bypass orifice 24 flows a portion of compressed air discharged from the discharge port 13 to the upstream pipe 14 through the bypass pipe 23 little by little.

A reference numeral 25 denotes a check valve 25 provided in the downstream pipe 15 located downstream of the pressure keeping mechanism 21. The check valve 25 prevents compressed air in the downstream pipe 15 from reversely flowing toward the compressor 1. The check valve 25 of the first embodiment is constituted as a general check valve in which a ball valve is accommodated in a valve casing, for example, and the check valve 25 can open substantially without resistance by the compressed air from the compressor 1.

Since the check valve 25 is provided in the downstream pipe 15 between the pressure keeping mechanism 21 and the air suspension 17, the compressed air in the downstream pipe 15 is applied to the pressure keeping valve 22, and it is possible to prevent the pressure keeping valve 22 from opening accidentally.

According to the air suspension apparatus of the first embodiment, when the vehicle height (air suspension 17) is increased by compressed air from the compressor 1, a pressure in the upstream pipe 14 is defined as a part-A pressure, a pressure in the downstream pipe 15 between the pressure keeping valve 22 and the check valve 25 is defined as a part-B pressure and a pressure downstream of the check valve 25 is defined as a part-C pressure. The relation of the part-A pressure, the part-B pressure, the part-C pressure, the supply/discharge valve 18, the discharge valve 20 and the pressure keeping valve 22 will be explained with reference to a time chart shown in FIG. 4.

First, when the vehicle height of the vehicle is to be increased, the orbiting scroll 4 of the compressor 1 is orbited by the electric motor 6, and compressed air which is sequentially compressed in the compression chambers 5 is discharged from the discharge port 13. Then, the compressor 1 is started and compressed air discharged from the discharge port 13 is supplied to the upstream pipe 14 located downstream of the discharge port 13. At this time, since a downstream end of the upstream pipe 14 is closed with the pressure keeping valve 22, the compressed air only flows toward the downstream pipe 15 through the bypass orifice 24 which has a small flow path area from the bypass pipe 23 little by little.

Therefore, the part-A pressure in the upstream pipe 14 having a small capacity increases in a short time after the compressor 1 is started and thus, the pressure in the compression chamber 5 between the fixed scroll 3 and the orbiting scroll 4 also increases in a short time. Therefore, the orbiting scroll 4 is pushed against the thrust receiving mechanism 11 by the pressure in the compression chamber 5 immediately after the compression chamber 5 is started and thus, the orbiting scroll 4 can orbit stably without rattling.

When the part-A pressure becomes higher than the valve-opening pressure of the pressure keeping valve 22, the pressure keeping valve 22 starts opening. With this, compressed air discharged from the discharge port 13 flows toward the downstream pipe 15 through the bypass orifice 24 and the ports 22B and 22C of the pressure keeping valve 22 and thus, the compressed air flows in volume through the large flow path area. Since the check valve 25 is opened and compressed air flows also to the downstream side, the part-C pressure downstream of the check valve 25 is also increased. However, the part-C pressure is smaller by a pressure loss of the check valve 25 than the part-B pressure between the pressure keeping valve 22 and the check valve 25. At this time, if the supply/discharge valve 18 is opened, the compressed air is supplied to the air suspension 17 and the vehicle height can be increased. If the vehicle height reaches a desired height position stably, the compressor 1 is stopped.

When the vehicle height is to be reduced, the supply/discharge valve 18 and the discharge valve 20 are opened and compressed air is discharged from the air suspension 17 through the downstream pipe 15 and the discharge pipe 19 to reduce the vehicle height. At this time, dry compressed air flows through the air dryer 16, moisture included in the moisture absorbent is moved into air and the moisture absorbent is regenerated.

Here, as shown in Hatsumei Kyokai Kokai Giho No. 2006-504219, if there is employed a structure in which magnets are provided between opposed surfaces of the fixed scroll and the orbiting scroll to suppress rattling of the orbiting scroll using a magnetic force between the opposed magnets, each scroll which has no space to be wasted and which is required to reduce in size cannot be provided with magnets capable of obtaining sufficiently strong magnetic force. In particular, since a compressor mounted on a vehicle is made very small, it is difficult to provide magnets. Therefore, since sufficiently strong magnetic force cannot be obtained, the orbiting scroll rattles when the operation is started, the orbiting scroll comes into contact with the fixed scroll, and the orbiting scroll is worn. If large magnets are provided so that sufficient magnetic force can be obtained, the entire compressor is increased in size.

In contrast, according to the first embodiment, the orbiting scroll 4 can be pushed against the thrust receiving mechanism 11 by increasing the pressure in the compression chamber 5 swiftly from the start of the operation. Therefore, it is unnecessary to provide the compressor 1 with a new device or member therein, and the compressor 1 is not increased in size. The orbiting scroll 4 can be pushed against the thrust receiving mechanism 11 with sufficient pressing force by using the pressure in the compression chamber 5.

Details of the first embodiment have been explained. Next, the effect of the first embodiment will be explained.

In this embodiment, the pressure keeping mechanism 21 is provided downstream of the discharge port 13 of the compressor 1, the flow path area of the pressure keeping mechanism 21 can be changed at least in two stages, the flow path area is small only with the bypass orifice 24 until the pressure (part-A pressure) of the upstream pipe 14 reaches the predetermined upstream pressure after the compressing operation is started, and if the pressure exceeds the predetermined upstream pressure, the opened pressure keeping valve 22 and the bypass orifice 24 are added and a large flow path area is permitted.

Therefore, the pressure (part-A pressure) in the upstream pipe 14 which is almost closed by the pressure keeping valve 22 of the pressure keeping mechanism 21 can be increased at a dash immediately after the compressor 1 is started, and the pressure in the compression chamber 5 can also be increased quickly accordingly. With this, the orbiting scroll 4 can orbit in a state where it is pushed against the thrust receiving mechanism 11 by the high pressure in the compression chamber 5.

As a result, the orbiting scroll 4 can be pushed against the thrust receiving mechanism 11 in a short time after the compressor 1 is started to allow stable orbiting operation, and it is possible to prevent the orbiting scroll 4 from rattling at the time of actuation thereof. With this, it is possible to prevent the scrolls 3 and 4 from coming into contact with each other, and to prevent them from being damaged or worn, lifetime of each of the scrolls 3 and 4 can be increased and reliability thereof can be enhanced.

Further, since pressure in the compression chamber 5 between the scrolls 3 and 4 is utilized for stabilizing the orbiting operation of the orbiting scroll 4, it is unnecessary to provide a new member unlike Hatsumei Kyokai Kokai Giho No. 2006-504219. Thus, it is possible to prevent the compressor 1 from increasing in size and the compressor 1 can be made more compact.

The pressure keeping valve 22 of the pressure keeping mechanism 21 is opened when the pressure in the upstream pipe 14 becomes equal to the predetermined pressure, but is not fully opened. Therefore, the pressure in the downstream pipe 15 can be increased while maintaining the pressure in the upstream pipe 14. When the pressure in the upstream pipe 14 and the pressure in the downstream pipe 15 become substantially equal to each other, the opening degree of the valve body 22E (between the inflow port 22B and the outflow port 22C) is increased in accordance with the pressure rise thereafter until the valve is eventually fully opened.

Since the pressure keeping mechanism 21 is provided with the bypass orifice 24 in parallel to the pressure keeping valve 22, compressed air can be supplied also to the downstream pipe 15 while swiftly increasing the pressure in the upstream pipe 14, and the pressure (part-B pressure) in the downstream pipe 15 can be increased.

The downstream pipe 15 is provided with the check valve 25 located downstream of the pressure keeping mechanism 21 and between the pressure keeping mechanism 21 and the air suspension 17. The check valve 25 can easily be opened by compressed air from the compressor 1 to send the compressed air to the air suspension 17. When the compressed air from the air suspension 17 reversely flows through the downstream pipe 15, however, the check valve 25 can block this flow. With this, it is possible to prevent the pressure keeping valve 22 from being accidentally opened by the reversely flowing compressed air. It is also possible to prevent noise and damage from being generated by the reverse rotation, and reliability can be enhanced.

In this embodiment, when the pressure keeping mechanism 21 is a check valve which is opened by a predetermined pressure, since the check valve receives the downstream pressure by the back surface of the valve body, a pressure loss is always generated even after the check valve is opened, a pressure difference remains between the upstream side and downstream side, and the pressure in the downstream pipe 15 cannot be increased appropriately. If the valve-opening pressure of the check valve is reduced on the other hand, since the pressure in the upstream pipe 14 is not sufficiently increased, it is not possible to sufficiently prevent the orbiting scroll from rattling.

Figure 5:
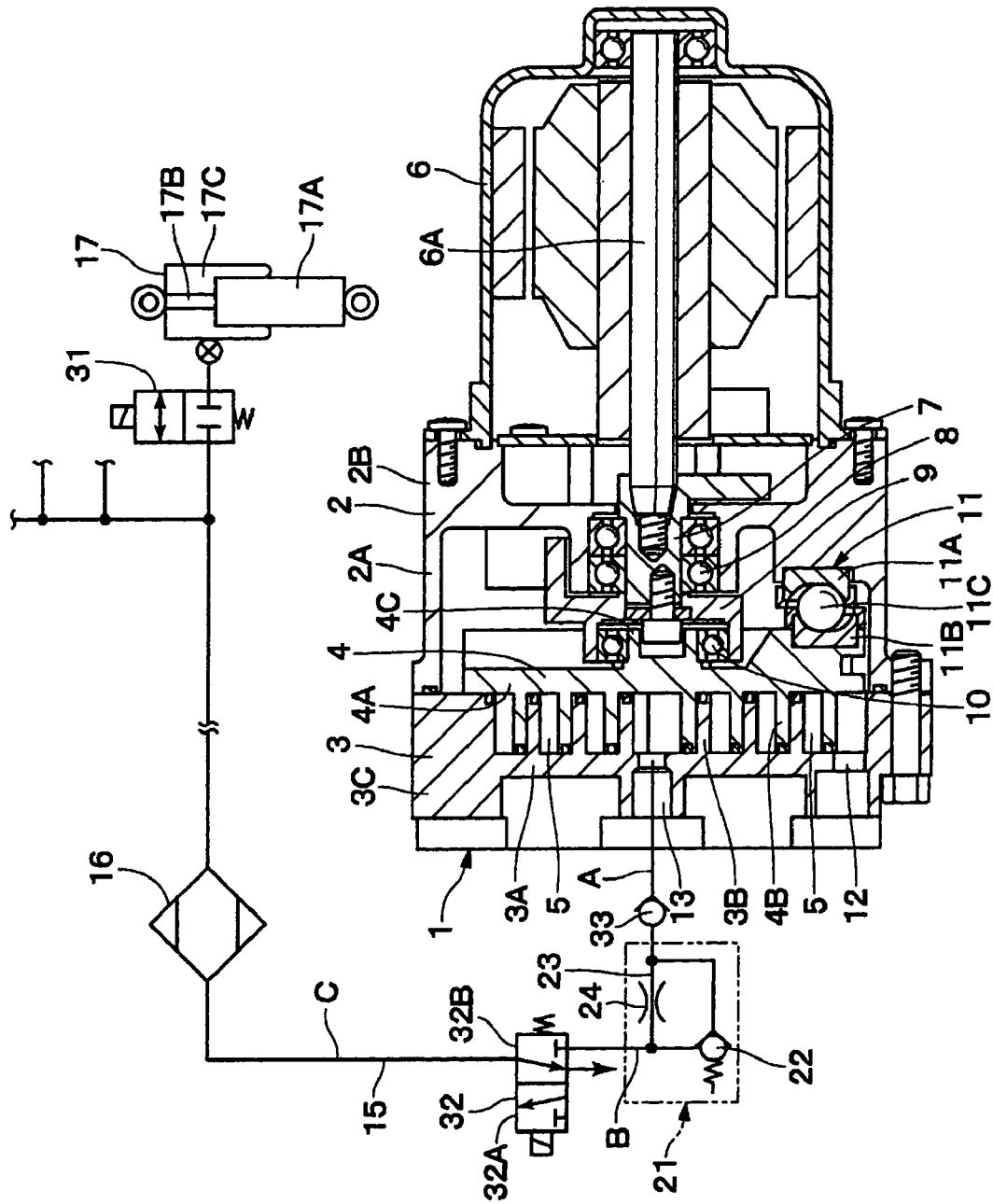
FIG. 5 is a diagram showing an entire structure of an air suspension apparatus and pipes according to a second embodiment of the invention.
Figure 6:
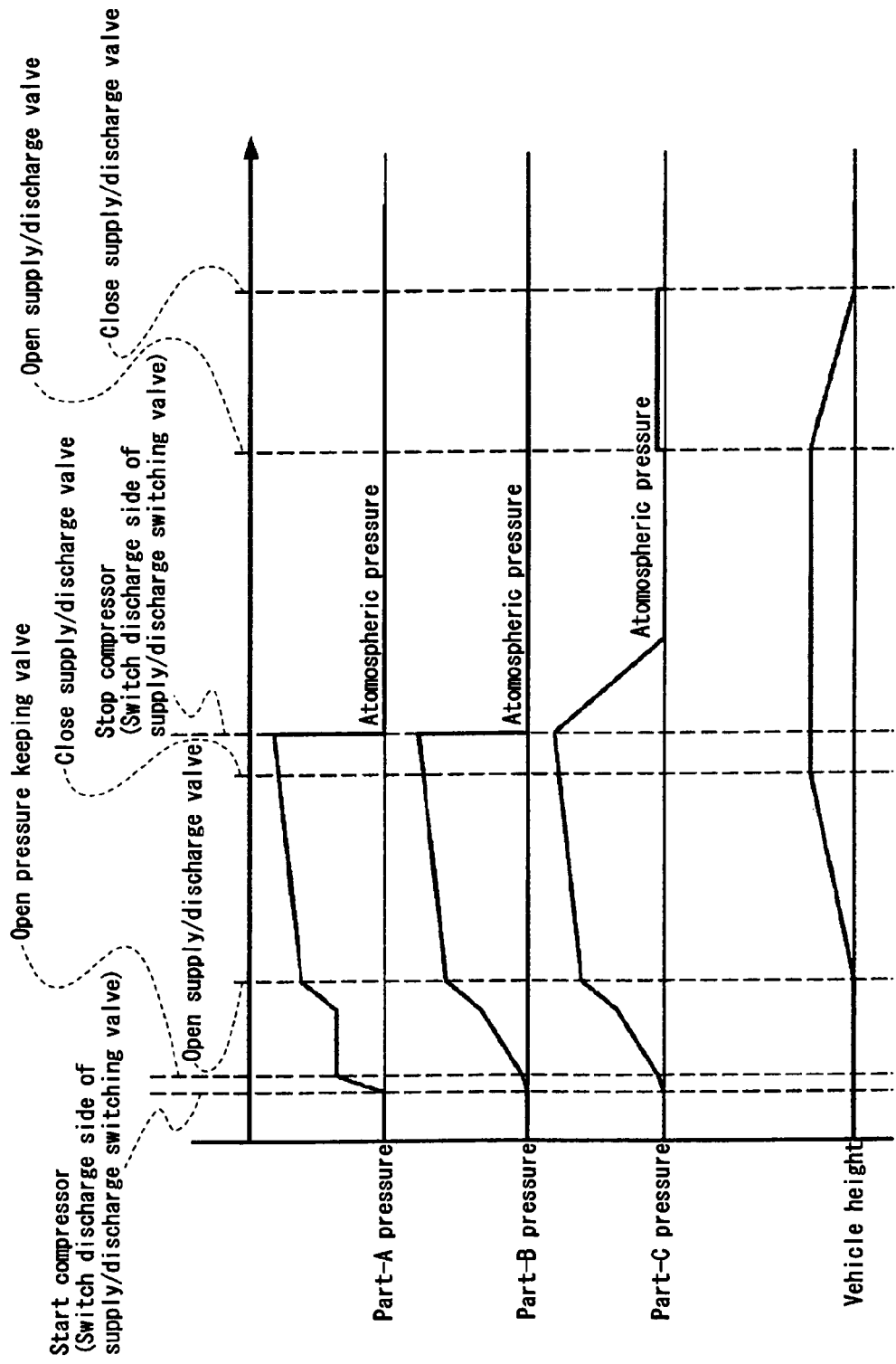
FIG. 6 is a time chart showing pressure variation in upstream and downstream pipes and open/close timing of a pressure keeping valve and a supply/discharge valve shown in FIG. 5.

Next, FIGS. 5 and 6 show a second embodiment of the air suspension apparatus according to the present invention. This embodiment is characterized in that the check valve is constituted by a supply/discharge valve which supplies and discharge compressed fluid through a dryer, and that another check valve is provided between the discharge port and the pressure keeping mechanism. Further, the supply and discharge of compressed air is switched by a supply/discharge switching valve. The second embodiment is the same as the above-described first embodiment except the supply/discharge valve, the supply/discharge switching valve and the check valve. Therefore, the same constituent elements as those of the first embodiment are designated with the same reference numerals, and explanation thereof will not be repeated.

A reference numeral 31 denotes a supply/discharge valve 31 according to the second embodiment provided on the side of an end of the downstream pipe 15 located near the air suspension 17. Like the supply/discharge valve 18 of the first embodiment, the supply/discharge valve 31 supplies and discharges compressed air to and from the air suspension 17 through the air dryer 16. In the second embodiment, the supply/discharge valve 31 is also used as a check valve which prevents compressed air from reversely flowing from the air suspension 17 toward the compressor 1.

A reference numeral 32 denotes a supply/discharge switching valve provided in the downstream pipe 15 at a position between the pressure keeping mechanism 21 and the air dryer 16. The supply/discharge switching valve 32 is a solenoid valve (three-port, two-position electromagnetic pilot type switching valve) having a supply switching position 32A for supplying compressed air from the compressor 1 to the air suspension 17 and a supply/discharge switching position 32B for discharging compressed air from the air suspension 17 to outside. The supply/discharge switching valve 32 comes to the supply/discharge switching position 32A when the compressor 1 is driven and the air suspension 17 is kept at a high position, and is switched to the discharge switching position 32B when the vehicle is lowered by the air suspension 17.

A reference numeral 33 denotes a check valve provided in the upstream pipe 14 between the discharge port 13 and the pressure keeping mechanism 21. The check valve 33 prevents compressed air in the downstream pipe 15 from reversely flowing toward the compressor 1. Like the check valve 25 in the first embodiment, the check valve 33 of the second embodiment is a general check valve which biases a valve body in a valve closing direction by a weak valve spring.

Next, according to the air suspension apparatus of the second embodiment, when the vehicle height (air suspension 17) is increased by compressed air from the compressor 1, a pressure in the upstream pipe 14 is defined as a part-A pressure, a pressure in the downstream pipe 15 between the pressure keeping valve 22 and the supply/discharge switching valve 32 is defined as a part-B pressure and a pressure downstream of the supply/discharge switching valve 32 is defined as a part-C pressure. A relation of the part-A pressure, the part-B pressure, the part-C pressure, the pressure keeping valve 22, the supply/discharge valve 31 and the supply/discharge switching valve 32 will be explained with reference to a time chart shown in FIG. 6.

First, when the vehicle height of the vehicle is to be increased, the supply/discharge switching valve 32 is switched to the supply switching position 32A and the compressor 1 is started to discharge compressed air from the discharge port 13. The compressed air discharged from the discharge port 13 by the start of the compressor 1 is supplied to the upstream pipe 14 located downstream of the discharge port 13. At this time, since a downstream end of the upstream pipe 14 is closed with the pressure keeping valve 22, the compressed air flows toward the downstream pipe 15 through the bypass orifice 24 which has a small flow path area in the bypass pipe 23 little by little.

Therefore, the part-A pressure in the upstream pipe 14 having a small capacity is increased in a short time after the compressor 1 is started and thus, the pressure in the compression chamber 5 between the fixed scroll 3 and the orbiting scroll 4 is also increased in a short time. Therefore, the orbiting scroll 4 is pushed against the thrust receiving mechanism 11 by the pressure in the compression chamber 5 immediately after the compression chamber 5 is started and thus, the orbiting scroll 4 can orbit stably without rattling.

When the part-A pressure becomes higher than the valve-opening pressure of the pressure keeping valve 22, the pressure keeping valve 22 starts opening. With this, compressed air discharged from the discharge port 13 flows toward the downstream pipe 15 through the bypass orifice 24 and the ports 22B and 22C of the pressure keeping valve 22 and thus, the compressed air flows in volume through the large flow path area. When the valve-opening pressure of the pressure keeping valve 22 is lower than a pressure required for the air suspension 17, the pressure keeping valve 22 is fully opened if the part-B pressure reaches the valve-opening pressure, and compressed air discharged from the discharge port 13 flows toward the downstream pipe 15 in volume.

At this time, since compressed air flows toward the downstream side through the supply/discharge switching valve 32, compressed air is supplied to the air suspension 17 by opening the supply/discharge valve 31, and the vehicle height can be increased. If the vehicle height is stabilized at a desired height position, the compressor 1 is stopped, the supply/discharge valve 31 is closed, and the supply/discharge switching valve 32 is switched to the discharge switching position 32B.

When the vehicle height is to be reduced, the supply/discharge valve 31 is opened, compressed air is discharged from the air suspension 17 through the downstream pipe 15 and the discharge switching position 32B of the supply/discharge switching valve 32, and the vehicle height can be reduced. At this time, dry compressed air flows through the air dryer 16, moisture included in the moisture absorbent is moved into air and the moisture absorbent is regenerated.

The second embodiment has the above-described structure. In this second embodiment, like the first embodiment, an effect that the orbiting scroll 4 can orbit stably at the time of actuation can also be achieved.

In particular, according to the second embodiment, since the supply/discharge valve 31 on the side of the air suspension 17 is also used as a check valve, it is possible to prevent compressed air from reversely flowing from the air suspension 17 toward the compressor 1, and the structure can be simplified. Further, since the downstream pipe 15 is provided with the supply/discharge switching valve 32, the discharge pipe 19 provided in the first embodiment can be omitted. Since the check valve 33 is provided between the discharge port 13 and the pressure keeping mechanism 21, it is possible to prevent a portion of compressed air in the downstream pipe 15 and the upstream pipe 14 from reversely flowing toward the compressor 1.

Figure 7:
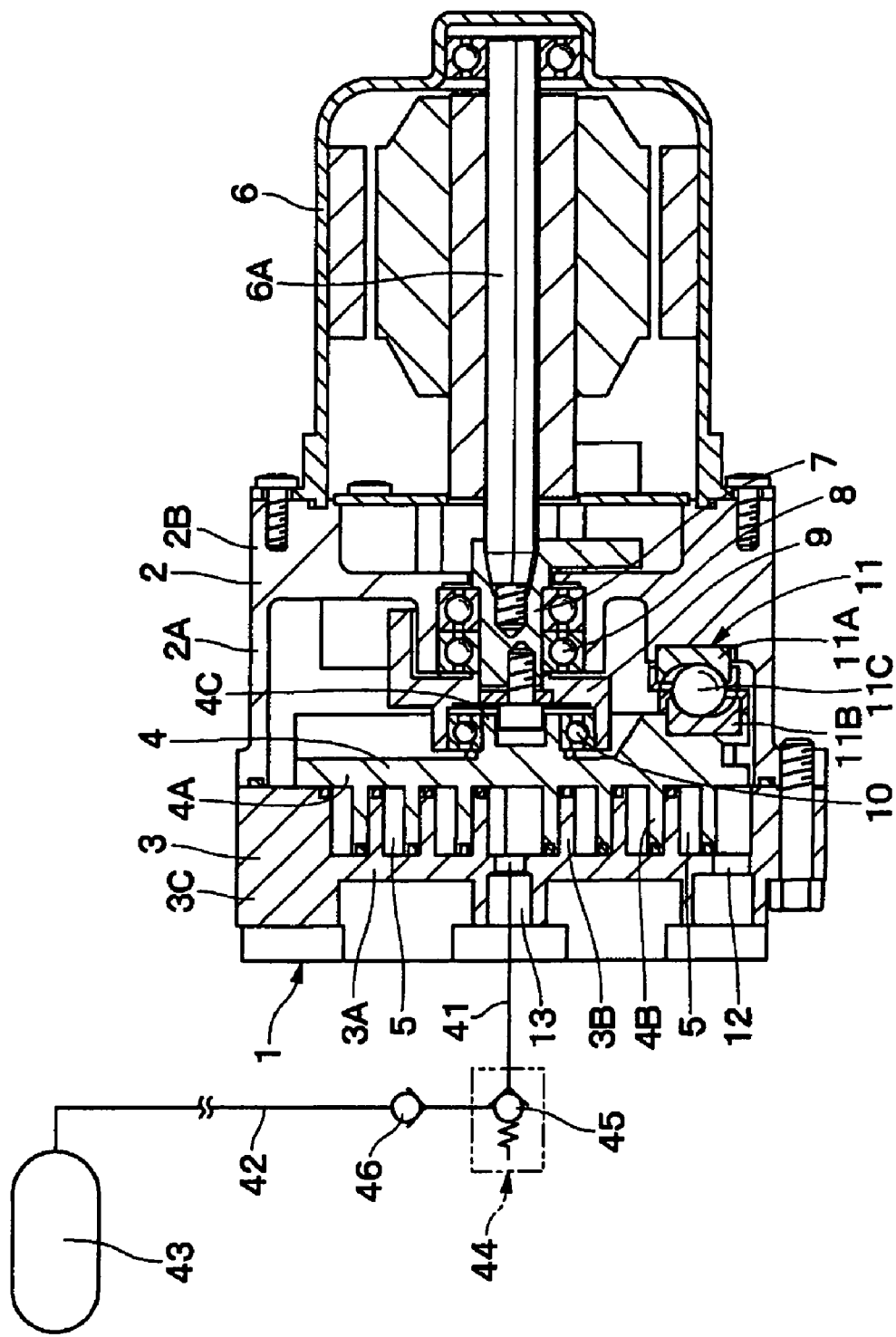
FIG. 7 is a diagram showing an entire structure of a scroll type air compressor and pipes according to a third embodiment of the invention.

Next, FIG. 7 shows a scroll type fluid machine according to a third embodiment of the present invention. The third embodiment is characterized in that the pressure keeping mechanism blocks the downstream side of the discharge port when the compressing operation is started, and a storage tank for storing compressed fluid is provided downstream of the pressure keeping mechanism. In the third embodiment, the same constituent elements as those of the first embodiment are designated with the same reference numerals, and explanation thereof will not be repeated.

First, pipes connected to the downstream side of the discharge port 13 of the compressor 1 will be explained. In FIG.

7, a reference numeral 41 denotes an upstream pipe which connects the discharge port 13 and a pressure keeping mechanism 44 which will be described later. A reference numeral 42 denotes a downstream pipe provided downstream of the pressure keeping mechanism 44, and the downstream side of the downstream pipe 42 is connected to a storage tank 43. The upstream pipe 41 and the downstream pipe 42 supply compressed air discharged from the compressor 1 to the storage tank 43. The pressure keeping mechanism 44 is provided between the upstream pipe 41 and the downstream pipe 42 on the upstream side which is on the side of the compressor 1.

A reference numeral 43 denotes the storage tank provided at the downstream end of the downstream pipe 42 downstream of the pressure keeping mechanism 44. Compressed air supplied from the compressor 1 is stored in the storage tank 43.

Next, the pressure keeping mechanism 44 according to the third embodiment provided for increasing the pressure in the compression chamber 5 of the compressor 1 in a short time will be explained.

A reference numeral 44 denotes the pressure keeping mechanism according to the third embodiment provided downstream of the discharge port 13 of the compressor 1. The pressure keeping mechanism 44 has a small flow path area (here, area is zero) until a pressure in the downstream pipe 42 located downstream of the pressure keeping mechanism 44 reaches a predetermined pressure after the compressor 1 starts compressing operation, and if the pressure exceeds the predetermined pressure, the pressure keeping mechanism 44 has a large flow path area.

The pressure keeping mechanism 44 is constituted by one pressure keeping valve 45. Like the pressure keeping valve 22 in the first embodiment, the pressure keeping valve 45 cuts off communication between the upstream pipe 41 and the downstream pipe 42 when the compressor 1 is stopped or immediately after the compressor 1 starts operation when the pressure in the upstream pipe 41 is low. If the pressure in the upstream pipe 41 increases and reaches a predetermined pressure, the opening degree (flow path area) of the pressure keeping valve 45 is increased. However, when the pressure in the upstream pipe 41 and the pressure in the downstream pipe 42 are different from each other, the opening degree does not become maximum. When the pressure in the upstream pipe 41 and the pressure in the downstream pipe 42 become substantially equal to each other, the pressure in the upstream pipe 41 and the pressure in the downstream pipe 42 are increased at the same time thereafter until the valve is eventually fully opened. With this, the pressure keeping valve 45 is changed from the blocked state where the flow path area is the minimum to the fully opened state where the flow path area is the maximum in a stepless manner. With this, the flow path area of the pressure keeping valve 45 can be changed from the fully closed state to the fully opened state in at least two stages.

A reference numeral 46 denotes a check valve according to the third embodiment provided in the downstream pipe 42 located downstream of the pressure keeping mechanism 44. Like the check valve 25 in the first embodiment, the check valve 46 prevents compressed air in the downstream pipe 42 from reversely flowing toward the compressor 1.

The third embodiment has the above-described structure. In the third embodiment, like the previous embodiments, an effect that the orbiting scroll 4 can stably orbit at the time of actuation can also be achieved.

In particular, according to the third embodiment, the pressure keeping valve 45 constituting the pressure keeping mechanism 44 blocks the downstream side of the discharge port 13, i.e., the upstream pipe 41 when the compressing operation of the compressor 1 is started. Therefore, the compressed air discharged from the discharge port 13 is not released toward the downstream pipe 42, and the pressure in the compression chamber 5 can be increased in a much shorter time. Further, sufficient compressed air can be stored in the storage tank 43.

In the case of the third embodiment, an air suspension can be mounted instead of the storage tank 43 like the first embodiment.

Figure 8:
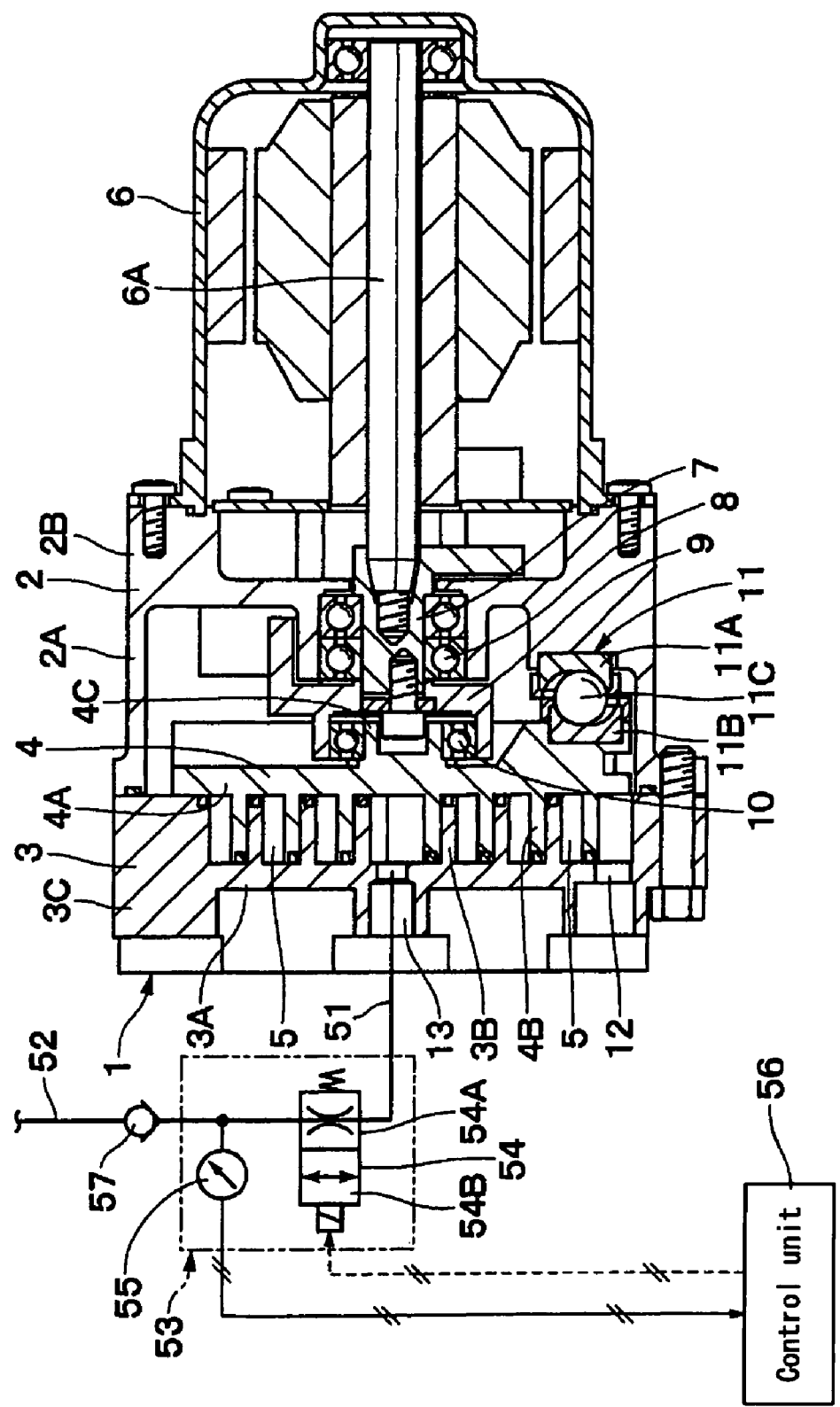
FIG. 8 is a diagram showing an entire structure of a scroll type air compressor and pipes according to a fourth embodiment of the invention.
Figure 9:
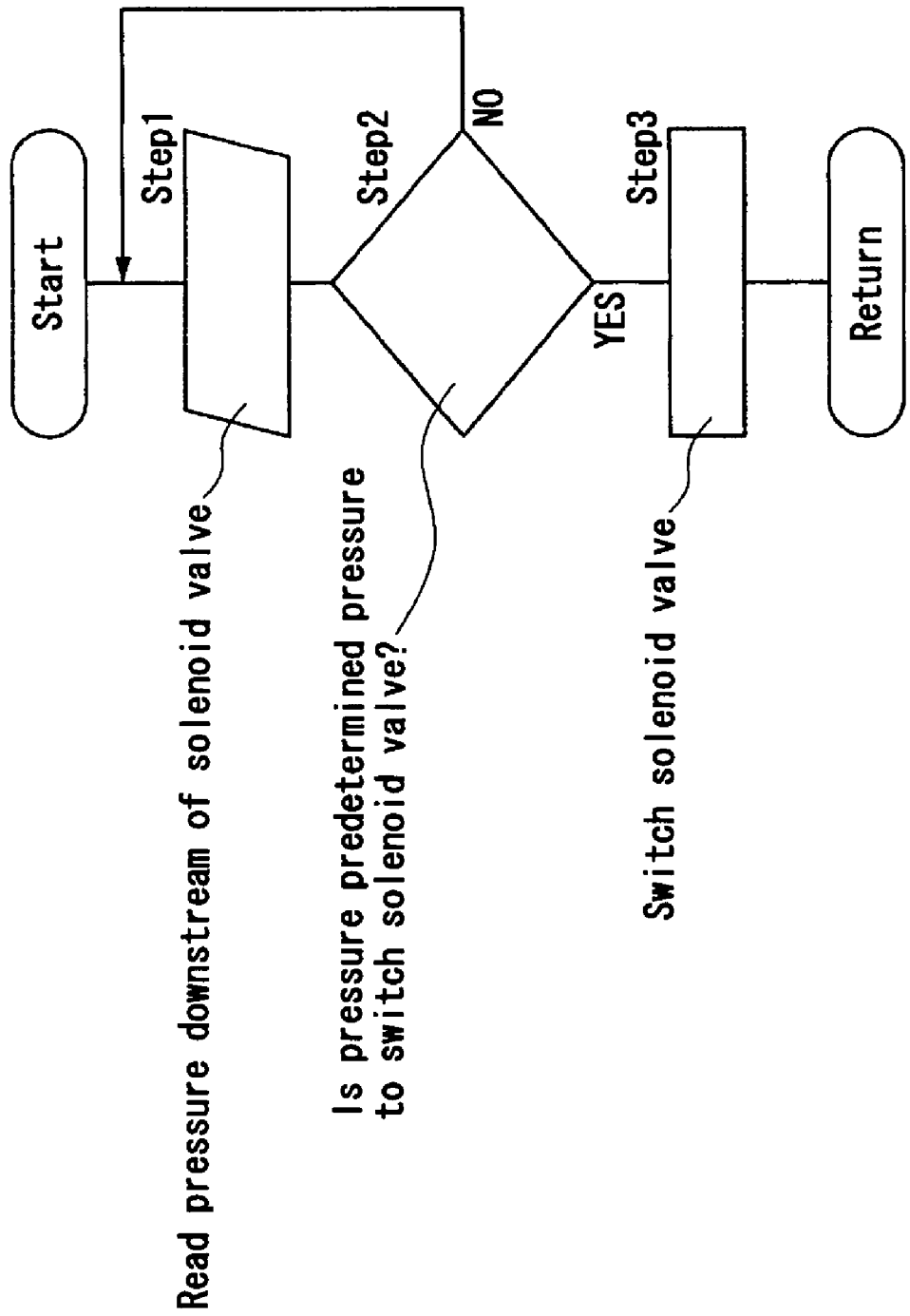
FIG. 9 is a flowchart showing control of a solenoid valve according to the fourth embodiment.

FIGS. 8 and 9 show a scroll type fluid machine according to the fourth embodiment of the present invention. The fourth embodiment is characterized in that the pressure keeping mechanism is formed as a solenoid valve including a small flow path switching section having a small flow path area and a large flow path switching section having a large flow path area, downstream pressure detecting means for detecting a pressure is provided downstream of the solenoid valve, the solenoid valve is set to the small flow path switching section until a detected value of the downstream pressure detection means reaches a predetermined pressure, and the solenoid valve is switched to the large flow path switching section after the detected value reaches the predetermined pressure. The solenoid valve includes an orifice in the small flow path switching section, and includes a large flow path communication passage in the large flow path switching section. In the fourth embodiment, the same constituent elements as those of the first embodiment are designated with the same reference numerals, and explanation thereof will not be repeated.

First, pipes connected to the downstream side of the discharge port 13 of the compressor 1 will be explained. In FIG. 8, a reference numeral 51 denotes an upstream pipe connecting the discharge port 13 and a pressure keeping mechanism 53, which will be described later, with each other. A reference numeral 52 denotes a downstream pipe provided downstream of the pressure keeping mechanism 53, and a downstream side of the downstream pipe 52 is connected to pneumatic devices (not shown) such as an air suspension and a storage tank. The upstream pipe 51 and the downstream pipe 52 supply compressed air discharged from the compressor 1 to the pneumatic devices, and the pressure keeping mechanism 53 is provided between the upstream pipe 51 and the downstream pipe 52 on the upstream side which is on the side of the compressor 1.

Next, the pressure keeping mechanism 53 according to the fourth embodiment provided for increasing the pressure in the compression chamber 5 of the compressor 1 in a short time will be explained.

A reference numeral 53 denotes the pressure keeping mechanism according to the fourth embodiment provided downstream of the discharge port 13 of the compressor 1. The pressure keeping mechanism 53 has the small flow path area until a pressure in the downstream pipe 52 downstream of the pressure keeping mechanism 53 reaches a predetermined pressure after the compressor 1 starts compressing operation, and has a large flow path area when the pressure exceeds the predetermined pressure. The pressure keeping mechanism 53 has a solenoid valve 54 which will be described later, and has a downstream pressure sensor 55 which detects a pressure provided downstream of the solenoid valve 54. The solenoid valve 54 is set to a small flow path switching section 54A until a detected value of the downstream pressure sensor 55 reaches a predetermined pressure, and the solenoid valve 54 is switched to a large flow path switching section 54B after the detected value reaches the predetermined pressure.

That is, a reference numeral 54 denotes the solenoid valve constituting the pressure keeping mechanism 53. The solenoid valve 54 is a two-port, two-position electromagnetic pilot type switching valve which selectively switches between the small flow path switching section 54A having the orifice and the large flow path switching section 54B having the large flow path communication passage. The solenoid valve 54 brings the upstream pipe 51 and the downstream pipe 52 into communication with each other through the small flow path switching section 54A until a detected value of the downstream pressure sensor 55 reaches a predetermined pressure, and the solenoid valve 54 is switched to the large flow path switching section 54B by a pilot signal from a control unit 56, which will be described later, after the detected value of the downstream pressure sensor 55 reaches the predetermined pressure. With this, the flow path area of the solenoid valve 54 can be changed in two stages, i.e., between the small flow path switching section 54A and the large flow path switching section 54B in this embodiment.

The predetermined pressure in the fourth embodiment is set to such a value that even if the pressure in the downstream pipe 52 is increased and the solenoid valve 54 is switched, the pressure in the upstream pipe 51 is not reduced abruptly. A pilot signal for switching to the large flow path switching section 54B under this predetermined pressure is output from the control unit 56.

That is, the predetermined pressure is such a value that when the solenoid valve 54 is switched to the large flow path switching section 54B and the upstream pipe 51 and the downstream pipe 52 are brought into communication with each other through the communication passage having a large flow path, compressed air in the upstream pipe 51 flows toward the downstream pipe 52 at a dash, the pressure is lowered, and the pressure in the downstream pipe 52 is increased to such a degree that the orbiting attitude of the orbiting scroll 4 is not in disorder.

A reference numeral 55 denotes the downstream pressure sensor as downstream pressure detecting means provided downstream of the solenoid valve 54. The downstream pressure sensor 55 detects a pressure in the downstream pipe 52, and outputs the detected pressure value to the later-described control unit 56.

A reference numeral 56 denotes the control unit. The control unit 56 reads a pressure value detected by the downstream pressure sensor 55, and outputs a pilot signal for switching the section to the large flow path switching section 54B to the solenoid valve 54 when the pressure value reaches a predetermined pressure.

A reference numeral 57 denotes a check valve 57 according to the fourth embodiment provided in the downstream pipe 52 located downstream of the pressure keeping mechanism 53. Like the check valve 25 of the first embodiment, the check valve 57 prevents compressed air in the downstream pipe 52 from reversely flowing toward the compressor 1.

Next, control of the pressure keeping mechanism 53 by the control unit 56 will be explained with reference to a flowchart shown in FIG. 9.

If the compressor 1 is started, the control unit 56 reads a pressure value detected by the downstream pressure sensor 55 in step 1, and determines whether the pressure value reaches a predetermined pressure under which the solenoid valve 54 is to be switched in step 2. At this time, if the pressure value detected by the downstream pressure sensor 55 does not reach the predetermined pressure, the reading operation of the pressure value is repeated. If the pressure value detected by the downstream pressure sensor 55 reaches the predetermined pressure, the procedure is advanced to step 3 where a pilot signal for switching to the large flow path switching section 54B is output to the solenoid valve 54.

The fourth embodiment has the above-described structure. Like the previous embodiments, the fourth embodiment can also provide an effect that the orbiting scroll 4 can stably orbit at the time of actuation.

In particular, according to the fourth embodiment, the pressure keeping mechanism 53 is formed as the solenoid valve 54 which includes the small flow path switching section 54A having the small flow path area formed by the orifice and a large flow path switching section 54B having the large flow path area, the downstream pressure sensor 55 which detects a pressure is provided downstream of the solenoid valve 54, the solenoid valve 54 is set to the small flow path switching section 54A until the detected value of the downstream pressure sensor 55 reaches the predetermined pressure, and the solenoid valve 54 is switched to the large flow path switching section 54B after the detected value reaches the predetermined pressure. With this, when the compressor 1 is actuated, the orbiting scroll 4 can be pushed against the thrust receiving mechanism 11 to stabilize the orbiting operation. The scrolls 3 and 4 are prevented from being damaged or worn by contact, and lifetime of each of the scrolls 3 and 4 can be increased.

Figure 10:
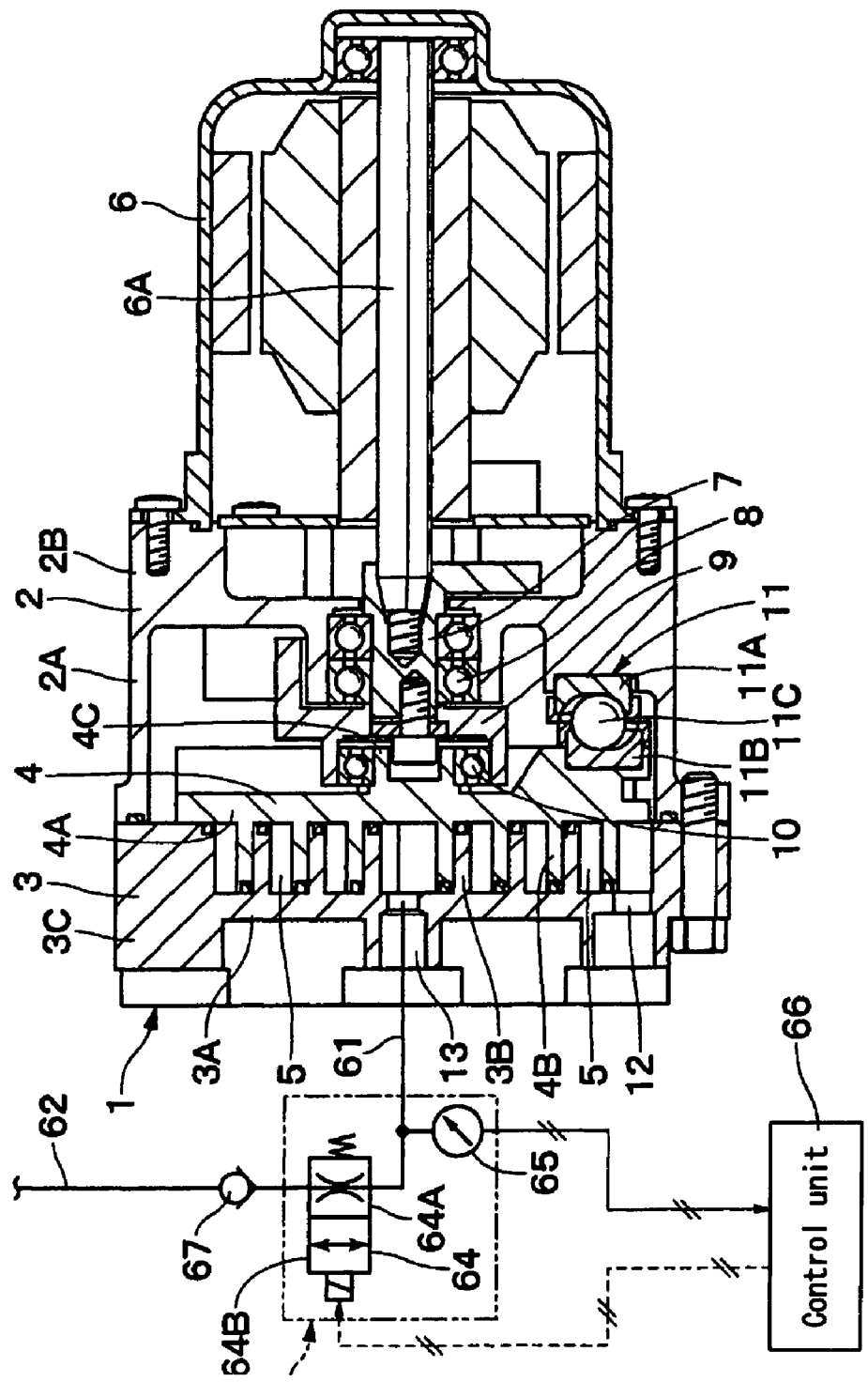
FIG. 10 is a diagram showing an entire structure of a scroll type air compressor, pipes and a control system according to a fifth embodiment of the invention.
Figure 11:
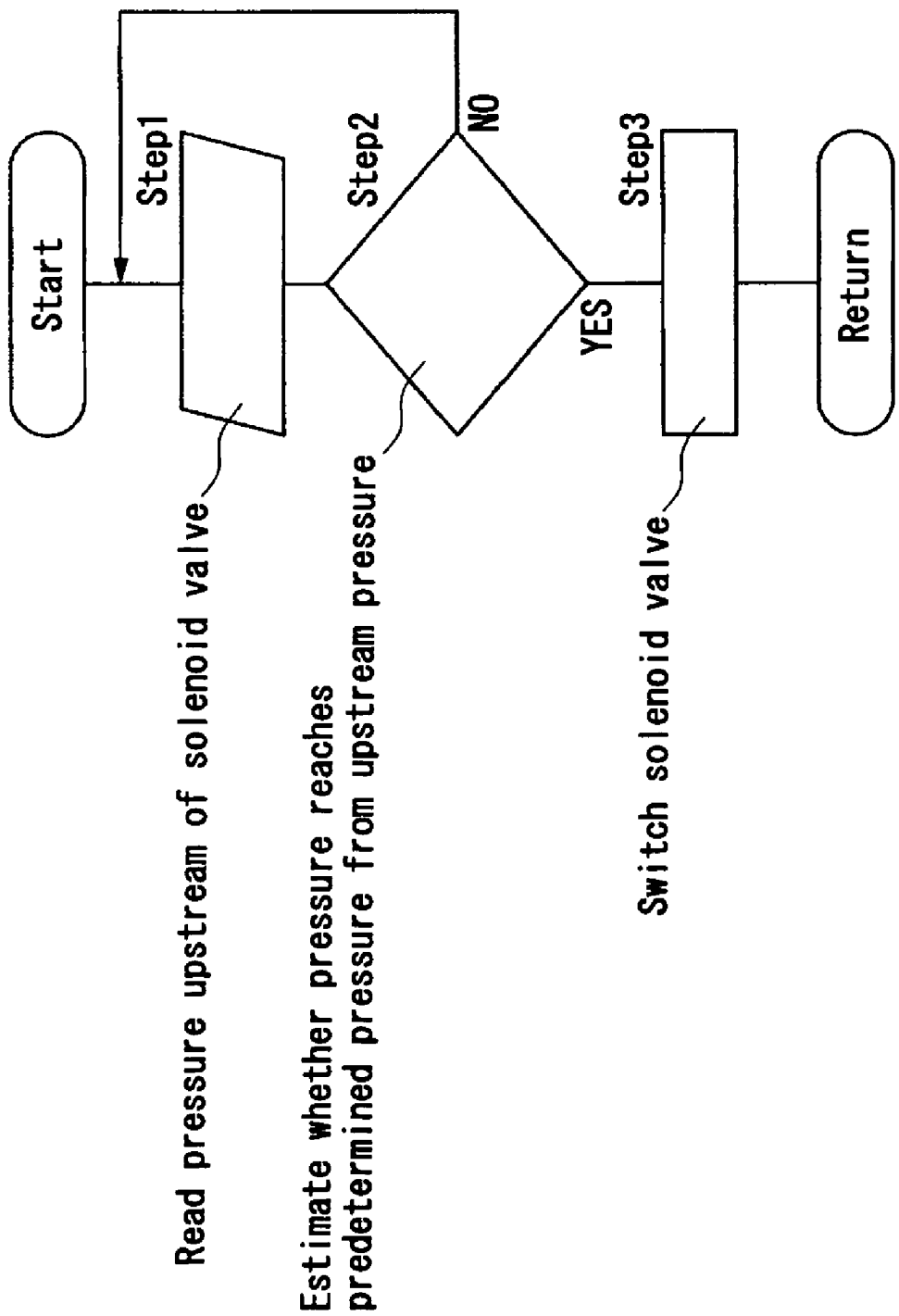
FIG. 11 is a flowchart showing control of a solenoid valve of the fifth embodiment.

Next, FIGS. 10 and 11 show a scroll type fluid machine according to a fifth embodiment. The fifth embodiment is characterized in that upstream pressure detection means which detects a pressure is provided upstream of the solenoid valve, a pressure downstream of the solenoid valve is estimated based on a detected value of the upstream pressure detection means, the solenoid valve is set to a small flow path switching section until the estimated value reaches a predetermined pressure, and the solenoid valve is switched to the large flow path switching section after the estimated value reaches the predetermined pressure. In the fifth embodiment, the same constituent elements as those of the first embodiment are designated with the same reference numerals, and explanation thereof will not be repeated.

First, in FIG. 10, a reference numeral 61 denotes an upstream pipe which connects the discharge port 13 and a pressure keeping mechanism 63, which will be described later, with each other. A reference numeral 62 denotes a downstream pipe provided downstream of the pressure keeping mechanism 63, and a downstream side of the downstream pipe 62 is connected to pneumatic devices (not shown) such as an air suspension and a storage tank.

Next, the pressure keeping mechanism 63 of the fifth embodiment provided for increasing pressure in the compression chamber 5 of the compressor 1 in a short time will be explained.

A reference numeral 63 denotes the pressure keeping mechanism according to the fifth embodiment provided downstream of the discharge port 13 of the compressor 1. The pressure keeping mechanism 63 includes a solenoid valve 64 which will be described later, an upstream pressure sensor 65 which detects a pressure is provided upstream of the solenoid valve 64, a pressure downstream of the solenoid valve 64 is estimated based on a detection value of the upstream pressure sensor 65, the solenoid valve 64 is set to a small flow path switching section 64A until the estimated value reaches the predetermined pressure, and the solenoid valve 64 is switched to a large flow path switching section 64B after the estimated value reaches the predetermined pressure.

That is, a reference numeral 64 denotes the solenoid valve constituting the pressure keeping mechanism 63. The solenoid valve 64 is constituted as a two-port, two-position electromagnetic pilot type switching valve which selectively switches between two switching positions, i.e., the small flow path switching section 64A having an orifice and the large flow path switching section 64B having the communication passage of large flow path. With this, the solenoid valve 64 can be changed in at least two stages, i.e., the small flow path switching section 64A and the large flow path switching section 64B in this embodiment.

A reference numeral 65 denotes the upstream pressure sensor as the upstream pressure detection means provided upstream of the solenoid valve 64. The upstream pressure sensor 65 detects a pressure in the upstream pipe 61, and outputs the detected pressure value to a control unit 66 which will be described later.

A reference numeral 66 denotes the control unit 66. The control unit 66 reads a pressure value detected by the upstream pressure sensor 65, estimates a pressure downstream of the solenoid valve 64 based on the pressure value, and outputs a pilot signal for switching to the large flow path switching section 64B to the solenoid valve 64 when the estimated value reaches the predetermined pressure.

A reference numeral 67 denotes a check valve of the fifth embodiment provided in the downstream pipe 62 located downstream of the pressure keeping mechanism 63. Like the check valve 25 of the first embodiment, the check valve 67 prevents compressed air in the downstream pipe 62 from reversely flowing toward the compressor 1.

Next, control of the pressure keeping mechanism 63 by the control unit 66 will be explained with reference to a flowchart shown in FIG. 11.

First, if the compressor 1 starts, the control unit 66 reads a pressure value detected by the upstream pressure sensor 65 in step 1, estimates a pressure downstream of the solenoid valve 64 based on the pressure value detected by the upstream pressure sensor 65 and determines whether the estimated pressure value reaches a predetermined pressure under which the solenoid valve 64 is to be switched in step 2. At this time, if the estimated pressure value does not reach the predetermined pressure, the reading operation of the pressure value is repeated. If the estimated pressure value reaches the predetermined pressure, the procedure is advanced to step 3 where a pilot signal for switching to the large flow path switching section 64B is output to the solenoid valve 64.

The fifth embodiment has the above-described structure. Like the previous embodiments, the fifth embodiment can also provide an effect that the orbiting scroll 4 can stably orbit at the time of actuation.

In particular, according to the fifth embodiment, the upstream pressure sensor 65 which detects a pressure is provided upstream of the solenoid valve 64, a pressure downstream of the solenoid valve 64 is estimated based on the detected value of the upstream pressure sensor 65, the solenoid valve 64 is set to the small flow path switching section 64A until the estimated value reaches the predetermined pressure, and the solenoid valve 64 is switched to the large flow path switching section 64B after the estimated value reaches the predetermined pressure. Therefore, even when the pressure downstream of the solenoid valve 64 cannot be detected due to layout or the like, it is possible to push the orbiting scroll 4 against the thrust receiving mechanism 11 to stabilize the orbiting motion when the compressor 1 is actuated. It is also possible to prevent the scrolls 3 and 4 from being damaged or worn by contact, and the lifetime of each of the scrolls 3 and 4 can be increased.

Figure 12:
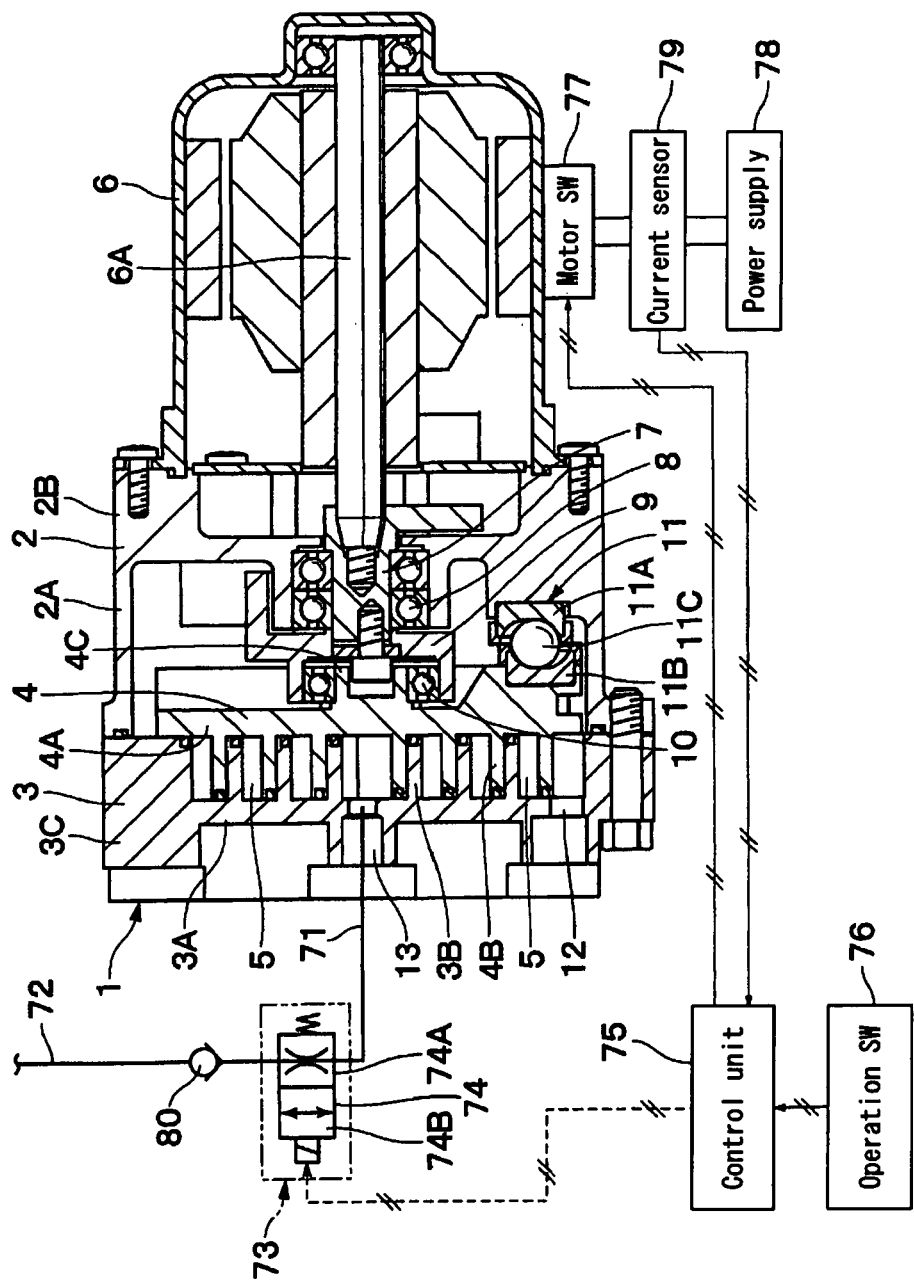
FIG. 12 is a diagram showing an entire structure of a scroll type air compressor, pipes and a control system according to a sixth embodiment of the invention.
Figure 13:
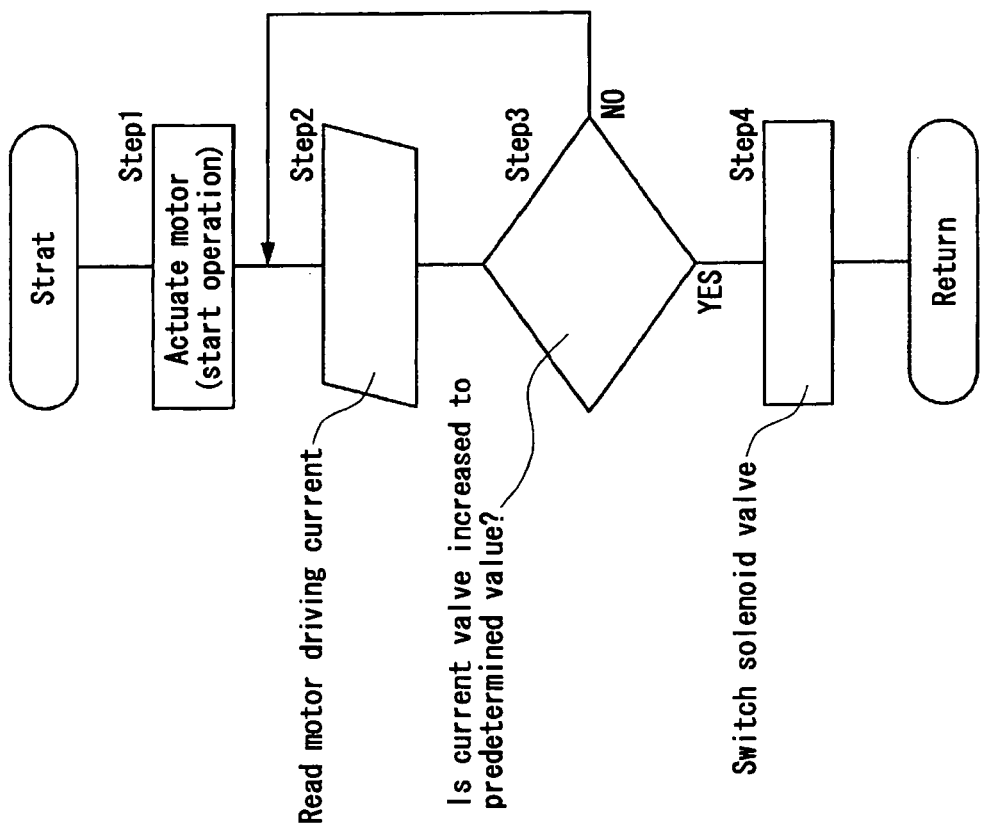
FIG. 13 is a flowchart showing control of a solenoid valve of the sixth embodiment.

Next, FIGS. 12 and 13 show a scroll type fluid machine according to a sixth embodiment of the present invention. The sixth embodiment is characterized in that en electric motor for driving scrolls is provided, a solenoid valve estimates a pressure value downstream of the solenoid valve based on a current value supplied to the electric motor, a small flow path switching section is used until a pressure reaches the estimated pressure value, and the small flow path switching section is switched to a large flow path switching section after the pressure reaches the estimated pressure value. In the sixth embodiment, the same constituent elements as those of the first embodiment are designated with the same reference numerals, and explanation thereof will not be repeated.

First, in FIG. 12, a reference numeral 71 denotes an upstream pipe which connects the discharge port 13 and a pressure keeping mechanism 73, which will be described later, with each other. A reference numeral 72 denotes a downstream pipe provided downstream of the pressure keeping mechanism 73. A downstream side of the downstream pipe 72 is connected to pneumatic devices (not shown) such as an air suspension and a storage tank.

Next, the pressure keeping mechanism 73 according to the sixth embodiment provided for increasing a pressure in the compression chamber 5 of the compressor 1 in a short time will be explained.

A reference numeral 73 denotes the pressure keeping mechanism of the sixth embodiment provided downstream of the discharge port 13 of the compressor 1. This pressure keeping mechanism 73 is constituted by a solenoid valve 74 which will be described later.

That is, a reference numeral 74 denotes a solenoid valve constituting the pressure keeping mechanism 73. The solenoid valve 74 is constituted as a two-port, two-position electromagnetic pilot type switching valve which selectively switches between two switching positions, i.e., the small flow path switching section 74A having an orifice and the large flow path switching section 74B having the communication passage of large flow path. With this, the solenoid valve 74 can be changed in at least two stages, i.e., the small flow path switching section 74A and the large flow path switching section 74B in this embodiment.

A reference numeral 75 denotes a control unit. The control unit 75 reads a current value for driving the electric motor 6 detected by a current sensor 79 which will be described later, estimates a pressure downstream of the solenoid valve 74 based on the current value, and outputs a pilot signal for switching to the large flow path switching section 74B to the solenoid valve 74 when the estimated value reaches a predetermined pressure.

A reference numeral 76 denotes an operation switch connected to the control unit 75. A reference numeral 77 denotes a motor switch which drives and stops the electric motor 6 based on operation of the operation switch 76. The motor switch 77 is connected to a power supply 78.

A reference numeral 79 denotes a current sensor provided between the motor switch 77 and the power supply 78. The current sensor 79 detects a current value supplied to the motor switch 77 (electric motor 6), and outputs the current value to the control unit 75. In this case, since the current value supplied to the electric motor 6 is varied in accordance with a load at the time of compressing operation, it is possible to estimate a pressure in the upstream pipe 71 and a pressure in the downstream pipe 72 based on the current value.

A reference numeral 80 denotes a check valve of the sixth embodiment provided in the downstream pipe 72 downstream of the pressure keeping mechanism 73. Like the check valve 25 of the first embodiment, the check valve 80 prevents compressed air in the downstream pipe 72 from reversely flowing toward the compressor 1.

Next, control of the pressure keeping mechanism 73 by the control unit 75 will be explained with reference to a flowchart shown in FIG. 13.

First, if the electric motor 6 is actuated by the operation switch 76 in step 1, the procedure is advanced to step 2 where the control unit 75 reads a current value supplied to the electric motor 6 detected by the current sensor 79. The control unit 75 estimates a pressure downstream of the solenoid valve 74 based on the current value detected by the current sensor 79, and determines whether the current value corresponding to the estimated pressure value is increased to a predetermined value at which the solenoid valve 74 is switched in step 3. At this time, if the current value does not reach the predetermined value, the reading operation of the current value is repeated. If the current value reaches the predetermined value, the procedure is advanced to step 4 where a pilot signal for switching to the large flow path switching section 74B is output to the solenoid valve 74.

The sixth embodiment has the above-described structure. Like the previous embodiments, the sixth embodiment can also provide an effect that the orbiting scroll 4 can stably orbit at the time of actuation.

In particular, according to the sixth embodiment, the electric motor 6 for driving the orbiting scroll 4 is provided, the solenoid valve 74 estimates the pressure value downstream of the solenoid valve 74 based on the current value supplied to the electric motor 6, the small flow path switching section 74A is used until the value reaches the estimated pressure value, and the small flow path switching section 74A is switched to the large flow path switching section 74B after the value reaches the estimated pressure value. Therefore, even when the pressure upstream or downstream of the solenoid valve 74 cannot be detected, the orbiting motion of the orbiting scroll 4 at the time of actuation of the compressor 1 can be stabilized only by detecting current for driving the electric motor 6, and lifetime of each of the scrolls 3 and 4 can be increased.

Figure 14:
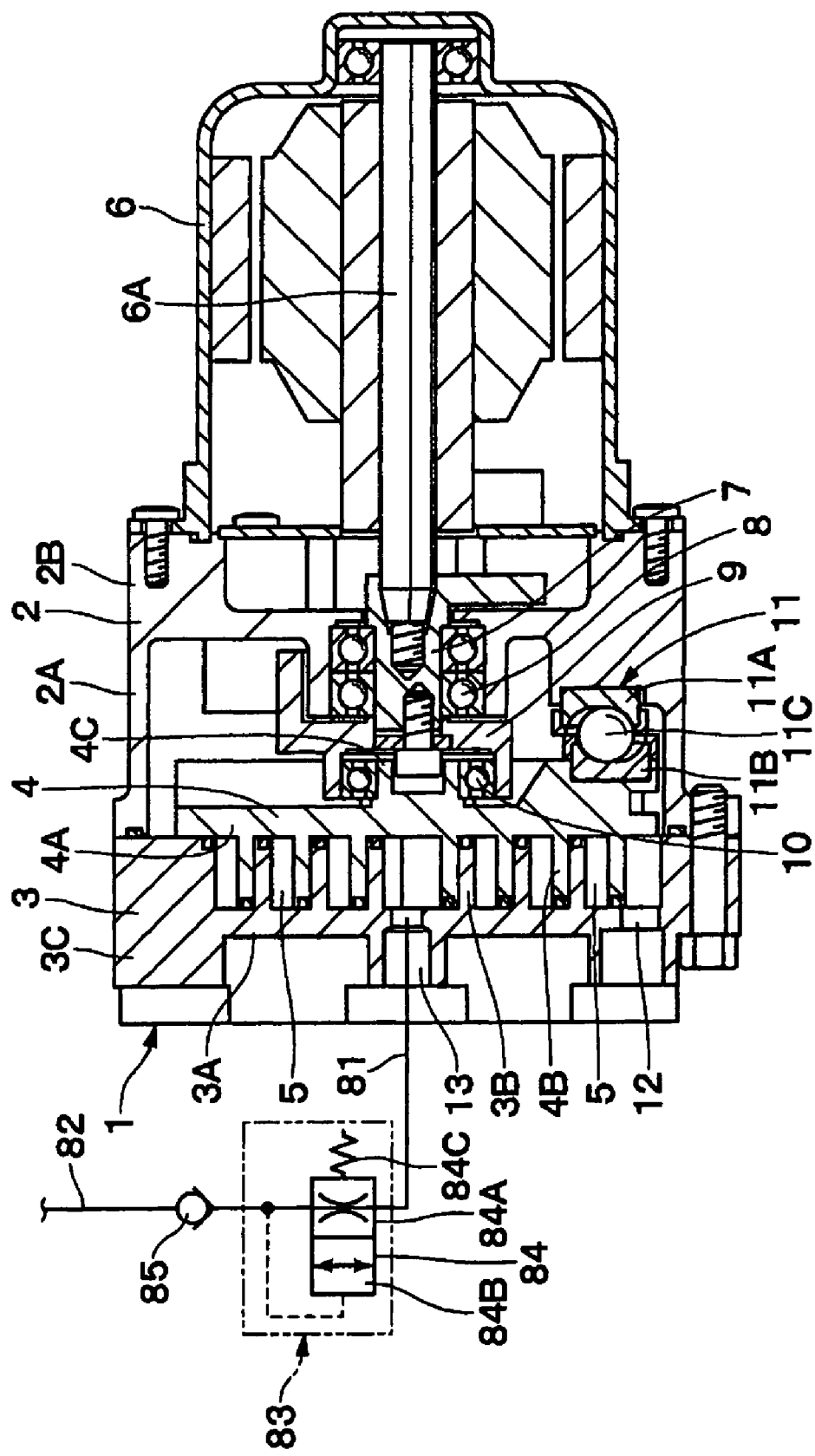
FIG. 14 is a diagram showing an entire structure of a scroll type air compressor and pipes according to a seventh embodiment of the invention.

Next, FIG. 14 shows a scroll type fluid machine according to a seventh embodiment of the present invention. The seventh embodiment is characterized in that the pressure keeping mechanism constituted by an air pilot type switching valve which switches between a small flow path switching section and a large flow path switching section while using the downstream pressure as a pilot pressure. In the seventh embodiment, the same constituent elements as those of the first embodiment are designated with the same reference numerals, and explanation thereof will not be repeated.

In FIG. 14, a reference numeral 81 denotes an upstream pipe which connects the discharge port 13 and a pressure keeping mechanism 83 which will be described later. A reference numeral 82 denotes a downstream pipe provided downstream of the pressure keeping mechanism 83. A downstream side of the downstream pipe 82 is connected to pneumatic devices (not shown) such as an air suspension and a storage tank.

Next, the pressure keeping mechanism 83 of the seventh embodiment provided for increasing a pressure in the compression chamber 5 of the compressor 1 in a short time will be explained.

A reference numeral 83 denotes the pressure keeping mechanism according to the seventh embodiment provided downstream of the discharge port 13 of the compressor 1. The pressure keeping mechanism 83 is constituted by a pneumatic valve 84 which will be described later.

That is, a reference numeral 84 denotes the pneumatic valve constituting the pressure keeping mechanism 83. The pneumatic valve 84 is constituted as a two-port, two-position air pilot type switching valve which selectively switches between two switching positions, i.e., a small flow path switching section 84A having an orifice and a large flow path switching section 84B having a communication passage of a large flow path while using air pressure downstream of the pneumatic valve 84 (downstream pipe 82) as a pilot pressure. With this, the flow path area of the pneumatic valve 84 can be changed at least in two stages, i.e., two stages of the small flow path switching section 84A and the large flow path switching section 84B in this embodiment.

The pneumatic valve 84 is provided with a valve spring 84C for resisting the pilot pressure. A spring force of the valve spring 84C is set to such a value that even if the pneumatic valve 84 is switched when the pressure in the downstream pipe 82 is increased, a pressure in the upstream pipe 81 is not abruptly reduced, and when the predetermined pressure is supplied as a pilot pressure, the small flow path switching section 84A is switched to the large flow path switching section 84B.

That is, the predetermined pressure is set to such a value that when the pneumatic valve 84 is switched to the large flow path switching section 84B and the upstream pipe 81 and the downstream pipe 82 are brought into communication with each other through the large flow path, compressed air in the upstream pipe 81 flows toward the downstream pipe 82 at a dash and a pressure thereof is reduced, and the pressure in the downstream pipe 82 is increased to such a level that the orbiting attitude of the orbiting scroll 4 is not in disorder.

With this, when the compressor 1 is actuated, the pneumatic valve 84 (pressure keeping mechanism 83) brings the upstream pipe 81 and the downstream pipe 82 into communication with each other through the small flow path switching section 84A having the small flow path area by a biasing force of the valve spring 84C. If the pressure becomes equal to the predetermined pressure having such a value that even if the pressure in the downstream pipe 82 is increased and the pneumatic valve 84 is switched, the pressure in the upstream pipe 81 is not reduced abruptly, the small flow path switching section 84A is switched to the large flow path switching section 84B against the valve spring 84C, and the upstream pipe 81 and the downstream pipe 82 are brought into communication with each other through the large flow path area.

A reference numeral 85 denotes a check valve of the seventh embodiment provided in the downstream pipe 82 located downstream of the pressure keeping mechanism 83. Like the check valve 25 of the first embodiment, the check valve 85 prevents compressed air in the downstream pipe 82 from reversely flowing toward the compressor 1.

The seventh embodiment has the above-described structure. Like the previous embodiments, the seventh embodiment can also provide an effect that the orbiting scroll 4 can stably orbit at the time of actuation.

In particular, according to the seventh embodiment, the pressure keeping mechanism 83 is constituted by the pneumatic valve 84 using the air pressure as a pilot pressure. With this, expensive solenoid valve or sensor is not used, electrical wiring or control is not required and thus, the machine can be constituted inexpensively, and the machine can be mounted on an existing pipe.

In the seventh embodiment, the air pressure in the downstream pipe 82 located downstream of the pneumatic valve 84 is switched as the pilot pressure. However, the air pressure in the upstream pipe 81 located upstream of the pneumatic valve 84 may be the pilot pressure and the pressure may be switched while assuming the downstream pressure.

Figure 15:
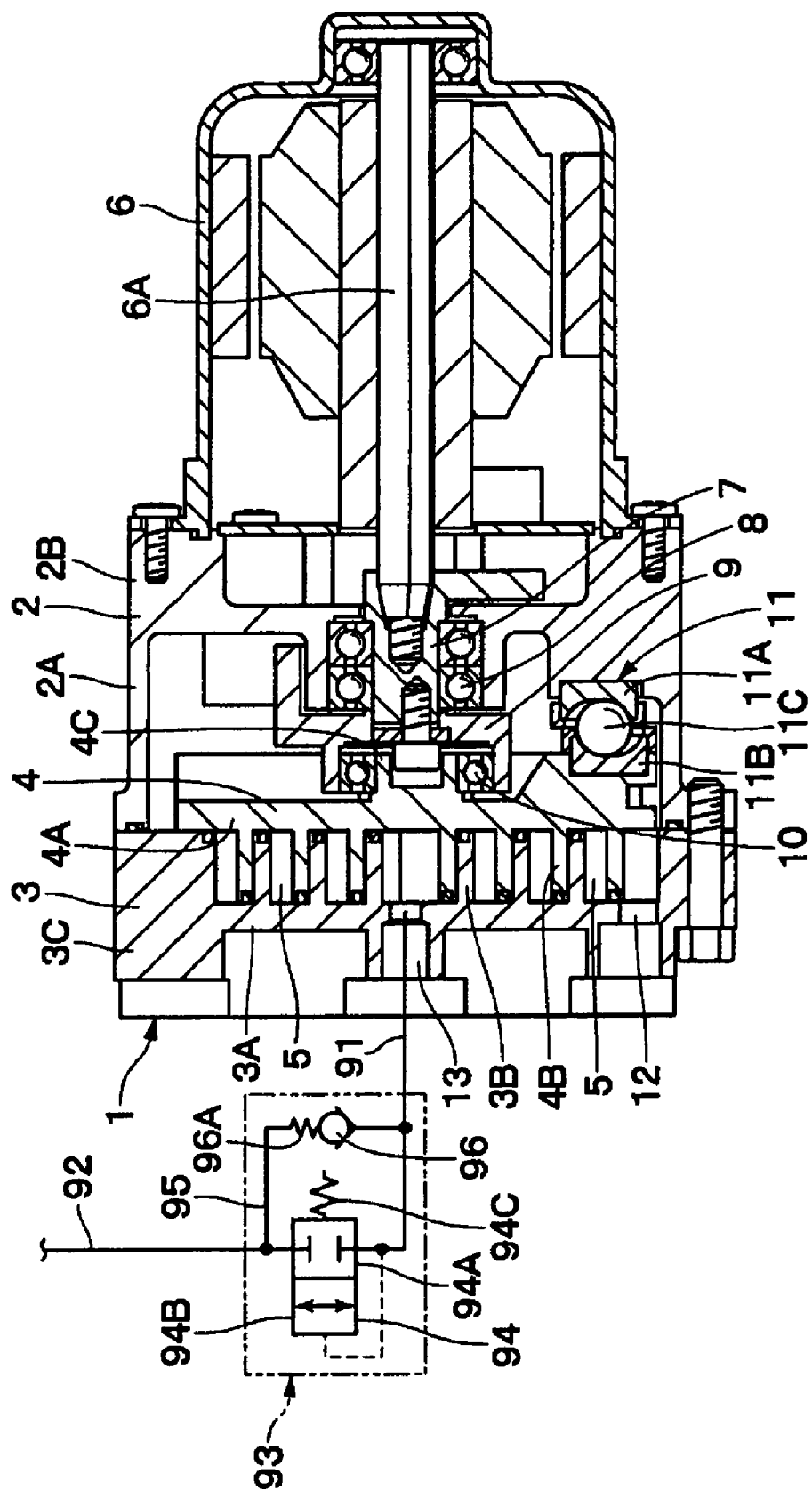
FIG. 15 is a diagram showing an entire structure of a scroll type air compressor and pipes according to an eighth embodiment of the invention.

Next, FIG. 15 shows a scroll type fluid machine according to an eighth embodiment of the present invention. The eighth embodiment is characterized in that the pressure keeping mechanism blocks the downstream of the discharge port when the compressing operation is started. In the eighth embodiment, the same constituent elements as those of the first embodiment are designated with the same reference numerals, and explanation thereof will not be repeated.

In FIG. 15, a reference numeral 91 denotes an upstream pipe which connects the discharge port 13 and a pressure keeping mechanism 93 which will be described later. A reference numeral 92 denotes a downstream pipe provided downstream of the pressure keeping mechanism 93, and a downstream side of the downstream pipe 92 is connected to pneumatic devices (not shown) such as an air suspension and a storage tank.

Next, the pressure keeping mechanism 93 of the eighth embodiment provided for increasing the pressure in the compression chamber 5 of the compressor 1 in a short time will be explained.

A reference numeral 93 denotes the pressure keeping mechanism of the eighth embodiment provided downstream of the discharge port 13 of the compressor 1. The pressure keeping mechanism 93 is constituted by an pneumatic valve 94 and a check valve 96, which will be described later.

That is, a reference numeral 94 denotes the pneumatic valve constituting the pressure keeping mechanism 93. The pneumatic valve 94 is constituted as a two-port, two-position air pilot type switching valve which selectively switches between two switching positions, i.e., a flow path blocking section 94A which blocks the flow path and a flow path communicating section 94B which brings the flow path into communication while using the air pressure upstream of the pneumatic valve 84 (upstream pipe 91) as pilot pressures.

The pneumatic valve 94 is provided with a valve spring 94C which resists the pilot pressure. A spring force of the valve spring 94C is set to such a value that when the pressure in the upstream pipe 91 reaches a predetermined pressure under which compressed air does not flow from the upstream pipe 91 to the downstream pipe 92 at a dash due to increase in the pressure in the downstream pipe 92, the flow path blocking section 94A is switched to the flow path communicating section 94B.

A reference numeral 95 denotes a bypass pipe which bypasses the pneumatic valve 94 and connects the upstream pipe 91 and the downstream pipe 92 with each other. A reference numeral 96 denotes a check valve provided in the bypass pipe 95. The check valve 96 prevents compressed air in the downstream pipe 92 from reversely flowing toward the compressor 1. The valve-opening pressure of the check valve 96 of the eighth embodiment is set higher than those of the above-described normal check valves. That is, a spring force of the valve spring 96A constituting the check valve 96 is set to such a value that the pressure in the compression chamber 5 can be kept at such a value that the orbiting scroll 4 can stably orbit.

With this, when the compressing operation of the compressor 1 is started, the pressure keeping mechanism 93 blocks the upstream pipe 91 downstream of the discharge port 13 by the pneumatic valve 94 and the check valve 96, and the pressure increasing time in the upstream pipe 91 is shortened. If the pressure in the upstream pipe 91 becomes higher than the valve-opening pressure of the check valve 96, the check valve 96 is opened, and the compressed air flows from the upstream pipe 91 through the bypass pipe 95 to the downstream pipe 92 through the small flow path area. When the pressure in the downstream pipe 92 is increased, the pressure in the upstream pipe 91 is also increased by a pressure loss caused by the check valve 96. Therefore, the pneumatic valve 94 is switched from the flow path blocking section 94A to the flow path communicating section 94B by this pressure. With this, compressed air flows from the upstream pipe 91 to the downstream pipe 92 through the large flow path area of the flow path communicating section 94B of the pneumatic valve 94 and the check valve 96.

Therefore, the flow path area of the pressure keeping mechanism 93 can be changed at least in two stages, i.e., a stage where only the check valve 96 is opened, and a stage where the flow path communicating section 94B and the check valve 96 are combined in this embodiment.

The eighth embodiment has the above-described structure. Like the previous embodiments, the eighth embodiment can also provide an effect that the orbiting scroll 4 can stably orbit at the time of actuation.

In particular, in the eighth embodiment, the pressure keeping mechanism 93 blocks the upstream pipe 91 downstream of the discharge port 13 when the compressing operation is started. Therefore, compressed air flowing toward the downstream pipe 92 is removed, and the pressure in the upstream pipe 91 can be increased in a much shorter time.

Figure 16:
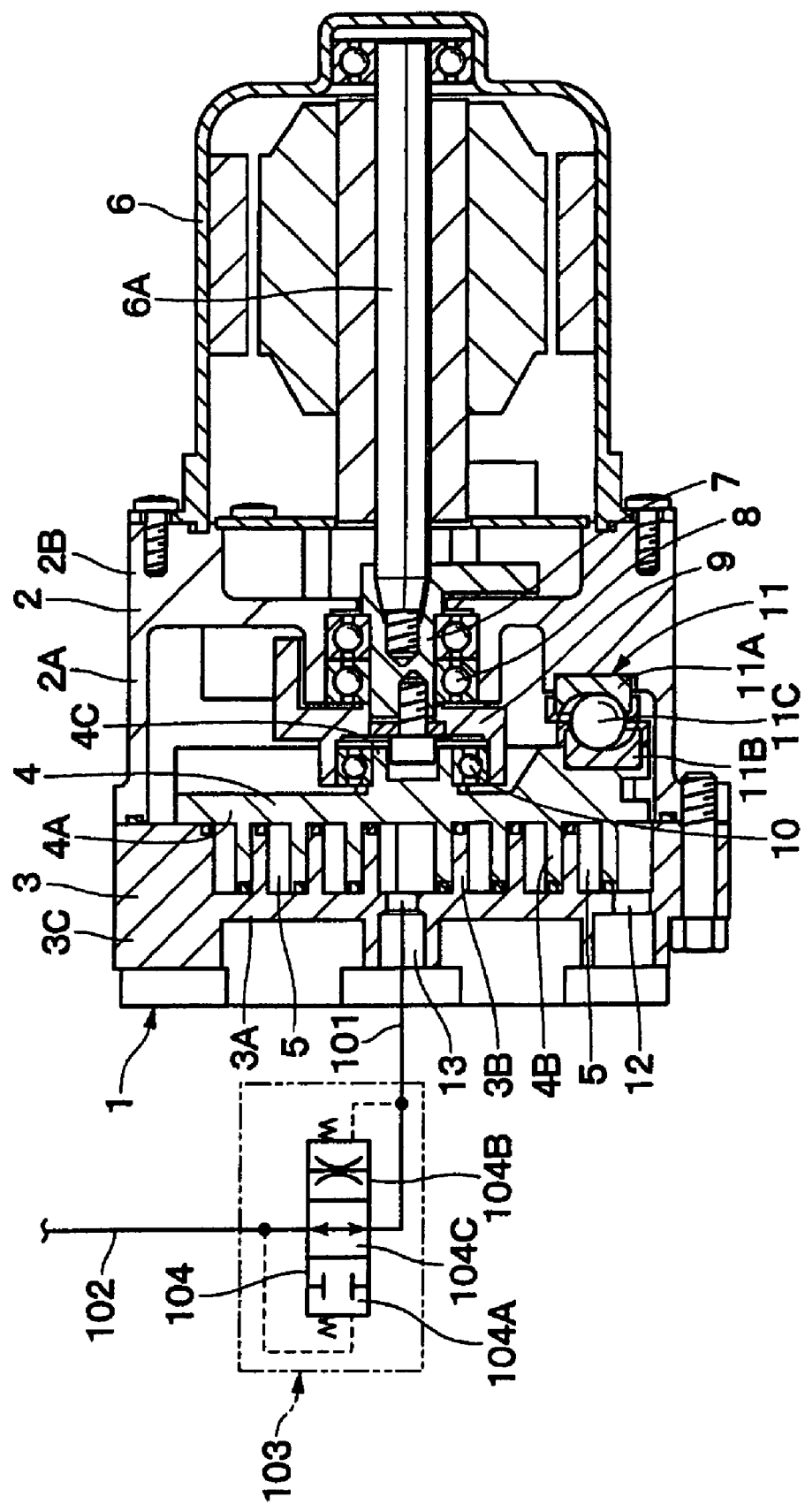
FIG. 16 is a diagram showing an entire structure of a scroll type air compressor, pipes and a control system according to a ninth embodiment of the invention.

Next, FIG. 16 shows a scroll type fluid machine according to a ninth embodiment of the present invention. The ninth embodiment is characterized in that the pressure keeping mechanism is constituted by a pilot type switching valve with three positions, i.e., a flow path blocking section, a small flow path switching section and a large flow path switching section. The pilot type switching valve is set to the small flow path switching section until the upstream pressure becomes equal to a predetermined pressure, the small flow path switching section is switched to the large flow path switching section when the pilot signal pressure becomes equal to the predetermined pressure, and the large flow path switching section is switched to the flow path blocking section when the downstream pressure becomes higher than the upstream pressure. In the ninth embodiment, the same constituent elements as those of the first embodiment are designated with the same reference numerals, and explanation thereof will not be repeated.

In FIG. 16, a reference numeral 101 denotes an upstream pipe which connects the discharge port 13 and a pressure keeping mechanism 103 which will be described later. A reference numeral 102 denotes a downstream pipe provided downstream of the pressure keeping mechanism 103. A downstream side of the downstream pipe 102 is connected to pneumatic devices (not shown) such as an air suspension and a storage tank.

Next, the pressure keeping mechanism 103 of the ninth embodiment provided for increasing the pressure in the compression chamber 5 of the compressor 1 in a short time will be explained.

A reference numeral 103 denotes the pressure keeping mechanism according to the ninth embodiment provided downstream of the discharge port 13 of the compressor 1. The pressure keeping mechanism 103 is constituted by a three-position pneumatic valve 104 which will be described later.

That is, a reference numeral 104 denotes the pneumatic valve as a pilot type switching valve constituting the pressure keeping mechanism 103. The pneumatic valve 104 is constituted as a two-port, three-position air pilot type switching valve of two-port and three-position which selectively switches between three switching positions, i.e., a flow path blocking section 104A which blocks the flow path, a small flow path switching section 104B having an orifice, and a large flow path switching section 104C having a communication passage of a large flow path, while using the air pressure upstream (upstream pipe 101) and downstream (downstream pipe 102) of the pneumatic valve 104 as a pilot pressure.

Here, when the compressing operation of the compressor 1 is started, since a pressure in the upstream pipe 101 is increased by compressed air discharged from the discharge port 13, the pneumatic valve 104 (pressure keeping mechanism 103) switches to the small flow path switching section 104B using this pressure as a pilot pressure. With this, the compressed air in the upstream pipe 101 passes through the small flow path switching section 104B and flows into the downstream pipe 102 and thus, the pressure in the downstream pipe 102 is increased.

When the pressure in the downstream pipe 102 is increased as high as the predetermined pressure, the pneumatic valve 104 is switched to the large flow path switching section 104C. When the compressed air reversely flows through the downstream pipe 102, the pressure in the downstream pipe 102 is increased by the compressed air which flows reversely and thus, the pneumatic valve 104 can be switched to the flow path blocking section 104A while using this pressure as the pilot pressure, and the flow path blocking section 104A prevents the compressed air from reversely flowing. With this, the flow path area of the pneumatic valve 104 can be changed at least in two stages; three stages in this embodiment, i.e., the flow path blocking section 104A, the small flow path switching section 104B and the large flow path switching section 104C.

The ninth embodiment has the above-described structure. Like the previous embodiments, the ninth embodiment can also provide an effect that the orbiting scroll 4 can stably orbit at the time of actuation.

In particular, in the ninth embodiment, the pressure keeping mechanism 103 is constituted by the pneumatic valve 104 which switches among the three positions, i.e., the flow path blocking section 104A, the small flow path switching section 104B and the large flow path switching section 104C, while using the pressure in the upstream pipe 101 and the pressure in the downstream pipe 102 as opposing pilot pressures.

Therefore, the pneumatic valve 104 is set to the small flow path switching section 104B until the pressure in the upstream pipe 101 becomes equal to the predetermined pressure. With this, when the compressor 1 is actuated, the pressure in the compression chamber 5 can be increased quickly. If the pneumatic valve 104 is switched to the large flow path switching section 104C when the pressure in the upstream pipe 101 becomes equal to the predetermined pressure, compressed air can flow from the upstream pipe 101 to the downstream pipe 102 through the large flow path area. When the compressed air reversely flows through the downstream pipe 102, the passage between the downstream pipe 102 and the upstream pipe 101 is blocked by the flow path blocking section 104A so that the compressed air can be prevented from flowing toward the compressor 1, and the check valve can be omitted.

Figure 17:
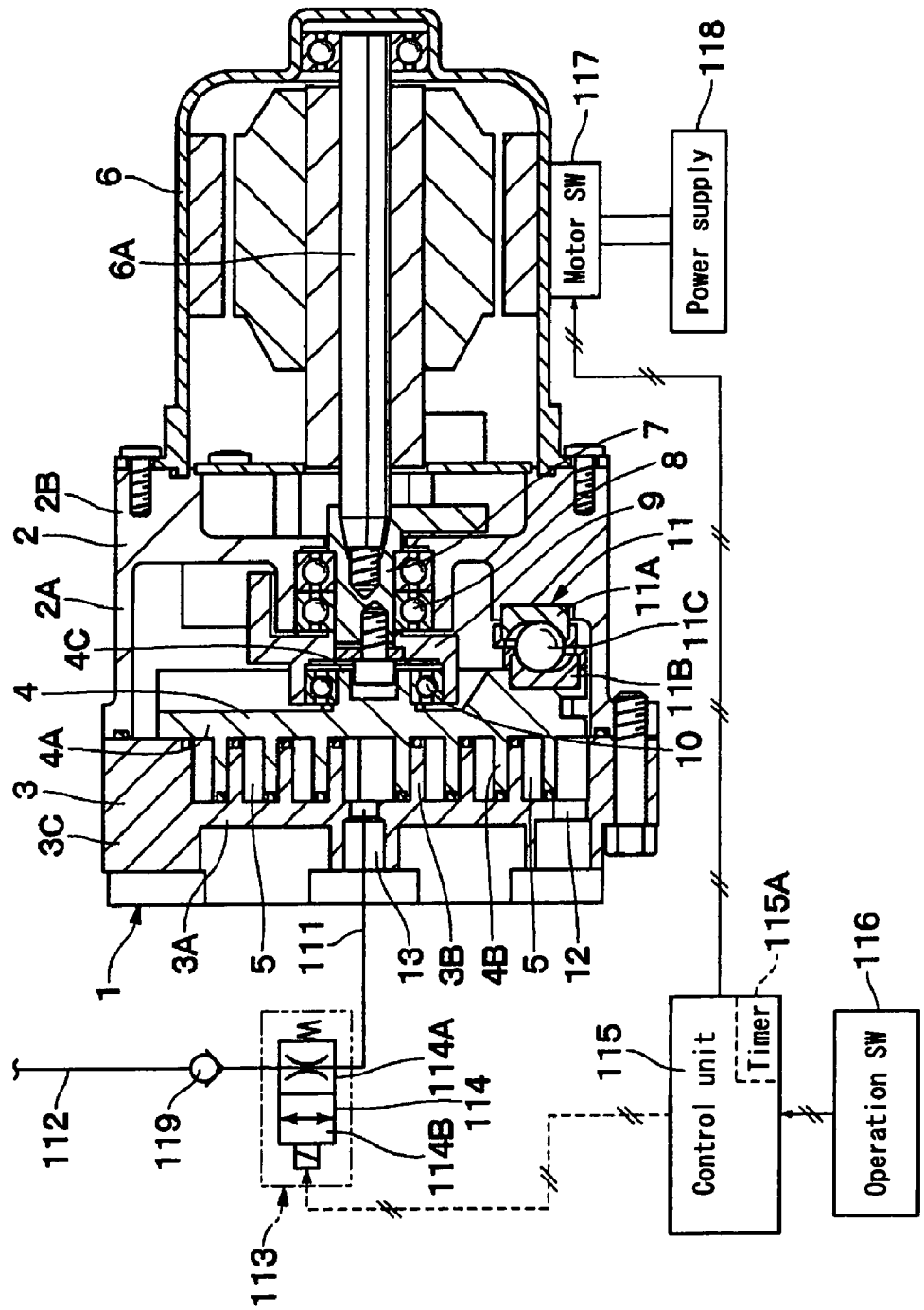
FIG. 17 is a diagram showing an entire structure of a scroll type air compressor and pipes according to a tenth embodiment of the invention.
Figure 18:
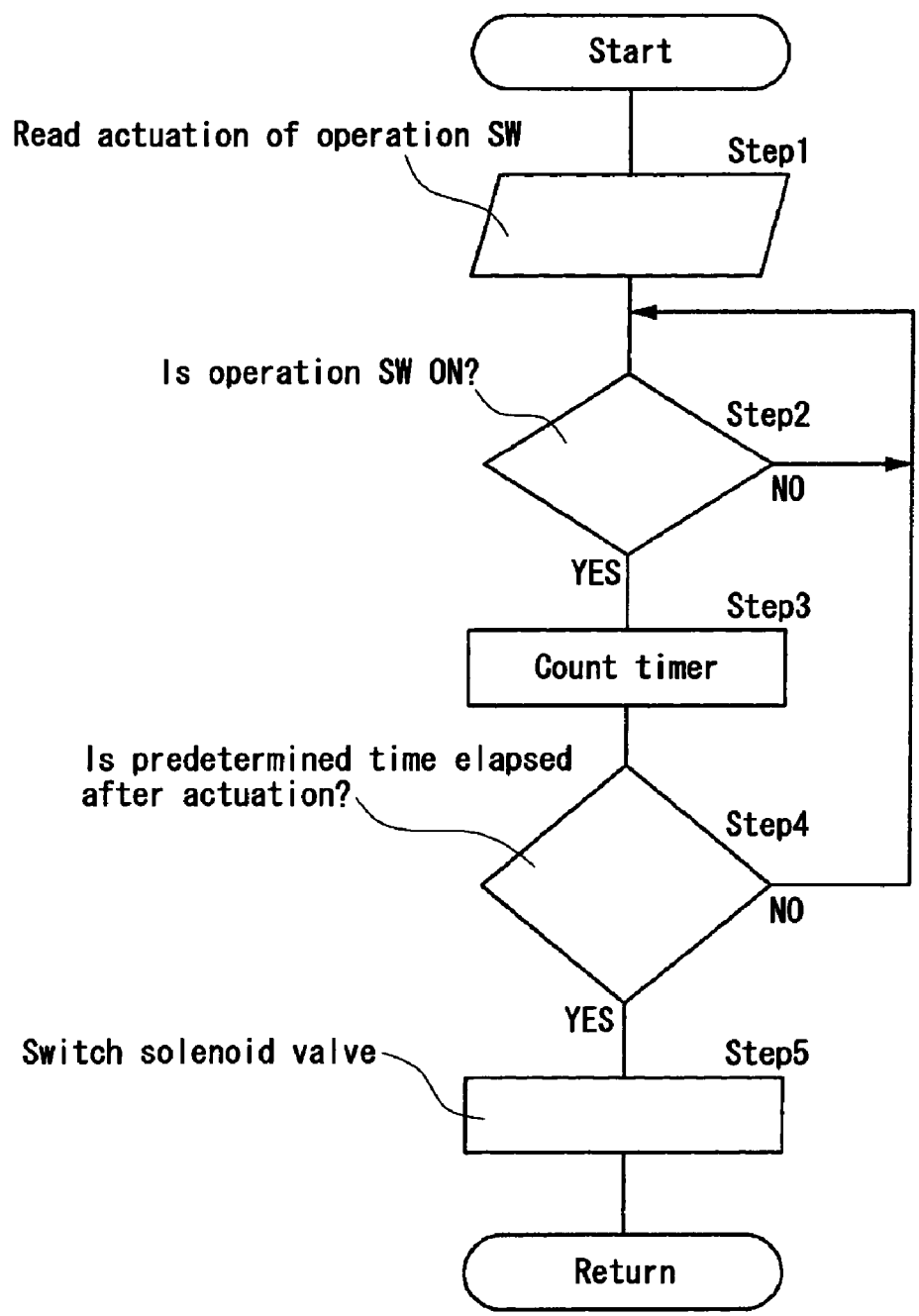
FIG. 18 is a flowchart showing control of a solenoid valve of the tenth embodiment.

Next, FIGS. 17 and 18 show a scroll type fluid machine according to a tenth embodiment of the present invention. The tenth embodiment is characterized in that a flow path area of the pressure keeping mechanism is changed at least in two stages such that a small flow path area is switched to a large flow path area when predetermined time is elapsed after the compressing operation is started. In the tenth embodiment, the same constituent elements as those of the first embodiment are designated with the same reference numerals, and explanation thereof will not be repeated.

In FIG. 17, a reference numeral 111 denotes an upstream pipe which connects the discharge port 13 and a pressure keeping mechanism 113 which will be described later. A reference numeral 112 denotes a downstream pipe provided downstream of the pressure keeping mechanism 113. A downstream side of the downstream pipe 112 is connected to pneumatic devices (not shown) such as an air suspension and a storage tank.

Next, the pressure keeping mechanism 113 of the tenth embodiment provided for increasing the pressure in the compression chamber 5 of the compressor 1 in a short time will be explained.

A reference numeral 113 denotes the pressure keeping mechanism according to the tenth embodiment provided downstream of the discharge port 13 of the compressor 1. The pressure keeping mechanism 113 is constituted by a solenoid valve 114 which will be described later.

That is, a reference numeral 114 denotes a solenoid valve constituting the pressure keeping mechanism 113. The solenoid valve 114 is constituted as a two-port, two-position electromagnetic pilot type switching valve for selectively switching between two switching positions, i.e., a small flow path switching section 114A having an orifice and a large flow path switching section 114B having a communication passage of large flow path. With this, the flow path area of the solenoid valve 114 can be changed at least in two stages, i.e., the small flow path switching section 114A and the large flow path switching section 114B in this embodiment.

A reference numeral 115 denotes a control unit. The control unit 115 is connected to the solenoid valve 114 and a motor switch 117 which will be described later. The control unit 115 includes a timer 115A for measuring time elapsed after the machine is actuated by an operation switch 116 which will be described later. The control unit 115 sets predetermined time elapsed after the compressor 1 starts operating by the timer 115A, and outputs a pilot signal for switching the solenoid valve 114 based on the timer 115A.

Here, the predetermined time is time elapsed until a pressure in the upstream pipe 111 is not abruptly reduced even if a pressure in the downstream pipe 112 is increased and the solenoid valve 114 is switched. That is, the predetermined time may be time during which compressed air in the upstream pipe 111 flows toward the downstream pipe 112 at a dash, the pressure is reduced and a pressure in the downstream pipe 112 can be increased to such a value that the orbiting attitude of the orbiting scroll 4 is not in disorder.

A reference numeral 116 denotes the operation switch connected to the control unit 115. A reference numeral 117 denotes the motor switch which drives and stops the electric motor 6 based on the operation of the operation switch 116. The motor switch 117 is connected to the power supply 118.

A reference numeral 119 denotes a check valve according to the tenth embodiment provided in the downstream pipe 112 located downstream of the pressure keeping mechanism 113. Like the check valve 25 in the first embodiment, the check valve 119 prevents compressed air in the downstream pipe 112 from reversely flowing toward the compressor 1.

Next, control of the pressure keeping mechanism 113 by the control unit 115 will be explained with reference to a flowchart shown in FIG. 18.

First, an actuation state of the operation switch 116 is read in step 1, and it is determined whether the operation switch 116 is in ON state in step 2. At this time, if the operation switch 116 is in OFF state, the reading operation of the actuation state of the operation switch 116 is repeated. If the operation switch 116 is in ON state, the timer 115A is counted in step 3, the procedure is advanced to step 4 where it is determined whether time reaches the predetermined time when the solenoid valve 114 is to be switched. At this time, if the count by the timer 115A does not reach the predetermined time, the procedure is done again from the reading operation of the actuation state of the operation switch 116. If the count by the timer 115A reaches the predetermined time, the procedure is advanced to step 5 where a pilot signal for switching to the large flow path switching section 114B is output to the solenoid valve 114.

The tenth embodiment has the above-described structure. Like the previous embodiments, the tenth embodiment can also provide an effect that the orbiting scroll 4 can stably orbit at the time of actuation.

In particular, in the tenth embodiment, since the timer 115A of the control unit 115 is used for switching the solenoid valve 114 of the pressure keeping mechanism 113, detection failure does not occur, and the solenoid valve 114 can be switched reliably.

In each of the fourth and sixth embodiments, a case is explained in which the solenoid valve 54, 74 of the pressure keeping mechanism 53, 73 is constituted as the electromagnetic pilot type switching valve having the two switching positions, i.e., the small flow path switching section 54A, 74A having the orifice of the small flow path area and the large flow path switching section 54B, 74B having the large flow path communication passage of the large flow path area.

However, the present invention is not limited to this, and the pressure keeping mechanism may be constituted by a solenoid valve as a pilot type switching valve having the flow path blocking section which blocks the flow path and the flow path communicating section which brings the flow paths into communication with each other, and a bypass orifice which is provided in parallel to the solenoid valve and which has a small flow path area.

In the first and second embodiments, a case in which compressed air is supplied to and discharged from the vehicular air suspension 17 as the pneumatic device by the compressor 1 is explained. In the third embodiment, a case in which compressed air is supplied to the storage tank 43 as the pneumatic device by the compressor 1 is explained. However, the present invention is not limited to these structures, and the compressor 1 may be used for supplying and discharging compressed air to and from a pneumatic device such as an air cylinder. This structure may also be applied to other embodiments.

In the embodiments, the thrust receiving mechanism 11 of the scroll type air compressor 1 is explained as the ball coupling in which the ball 11C is disposed between the support members 11A and 11B. However, the present invention is not limited to this, and a thrust receiving plate, for example, which comes into sliding contact with the back surface of the end plate 4A of the orbiting scroll 4 may be used as the thrust receiving mechanism.

What is claimed is:

1. A scroll type fluid machine comprising:
   one scroll including a spiral wrap portion extending from a surface of an end plate;
   the other scroll which is opposed to said one scroll, including a spiral wrap portion extending from a surface of an end plate, said wrap portion of said other scroll overlapping said wrap portion of said one scroll to define a compression chamber;
   a thrust receiving mechanism which is provided on a back surface of at least one of said one scroll and said other scroll, which permits a gap in a thrust direction between said end plate and said wrap portion to vary by a predetermined amount and supports said end plate in the thrust direction;
   a discharge port which is provided on a radially inner side of at least one of said one scroll and said other scroll, and which discharges compressed fluid which is compressed by the compression chamber; and
   a pressure keeping mechanism provided downstream of said discharge port, the pressure keeping mechanism increasing a pressure in said compression chamber right after operation starts so as to push said scroll on a side where said thrust receiving mechanism is provided at its back toward the thrust receiving mechanism,
   wherein a flow path area of said pressure keeping mechanism can be changed to at least two levels, a small flow path area is set until a pressure upstream of said pressure keeping mechanism reaches a predetermined upstream pressure after a compressing operation is started, and the flow path area is permitted to be changed to a large flow path area after the pressure exceeds said predetermined upstream pressure.

2. A scroll type fluid machine according to claim 1, wherein said pressure keeping mechanism is a pressure keeping valve whose opening degree is changed such that the pressure upstream of said pressure keeping mechanism is kept constant.

3. A scroll type fluid machine according to claim 1, wherein said pressure keeping mechanism is a solenoid valve whose small flow path area having a value except 0, and said solenoid valve includes a small flow path switching section having a small flow path area and a large flow path switching section having a large flow path area.

4. A scroll type fluid machine according to claim 3, wherein downstream pressure detection means for detecting a pressure is provided downstream of said solenoid valve, said solenoid valve is switched to the small flow path switching section until a detected value of said downstream pressure detection means reaches a predetermined downstream pressure, and said solenoid valve is switched to the large flow path switching section after said detected value reaches said predetermined downstream pressure.

5. A scroll type fluid machine according to claim 3, wherein upstream pressure detection means for detecting a pressure is provided upstream of said solenoid valve, a pressure downstream of said solenoid valve is estimated based on a detected value of said upstream pressure detection means, said solenoid valve is switched to the small flow path switching section until the estimated value reaches a predetermined downstream pressure, and said solenoid valve is switched to the large flow path switching section after said estimated value reaches said predetermined downstream pressure.

6. A scroll type fluid machine according to claim 3, wherein said solenoid valve calculates time until the pressure downstream of said solenoid valve reaches a predetermined downstream pressure based on time elapsed after the compressing operation by said scrolls is started, said solenoid valve is set to said small flow path switching section until the time elapsed after the compressing operation is started reaches the calculated time, and said solenoid valve is switched to said large flow path switching section after the time reaches said calculated time.

7. A scroll type fluid machine according to claim 3, further comprising an electric motor for driving said scroll, wherein said solenoid valve estimates a pressure value downstream of said solenoid valve based on a value of current supplied to said electric motor, said solenoid valve is set to the small flow path switching section until the estimated value reaches a predetermined downstream pressure, and said solenoid valve is switched to the large flow path switching section after said estimated value reaches said predetermined downstream pressure.

8. A scroll type fluid machine according to claim 1, wherein said pressure keeping mechanism includes a pilot type switching valve including a flow path block section for blocking the flow path and a large flow path switching section having a large flow path area, and a bypass orifice which bypasses said pilot type switching valve, which is provided in parallel to said pilot type switching valve and which has a small flow path area, and said pilot type switching valve is switched to the flow path block section so that only said bypass orifice functions as the flow path until upstream pressure and downstream pressure of said pilot type switching valve become substantially equal to each other, and said pilot type switching valve is switched to the large flow path switching section after the upstream pressure and downstream pressure become substantially equal to each other.

9. A scroll type fluid machine according to claim 1, wherein said pressure keeping mechanism includes a pilot type switching valve having three positions of a flow path block section, a small flow path switching section and a large flow path switching section, said pilot type switching valve is switched to the small flow path switching section until upstream pressure and downstream pressure become substantially equal to each other, said pilot type switching valve is switched to the large flow path switching section when the upstream pressure and the downstream pressure become substantially equal to each other, and said pilot type switching valve is switched to the flow path block section when the downstream pressure becomes higher.

10. A scroll type fluid machine according to claim 1, wherein a check valve which prevents back flow of compressed fluid existing downstream of said pressure keeping mechanism is provided between said discharge port and said pressure keeping mechanism, or downstream of said pressure keeping mechanism.

11. A scroll type fluid machine according to claim 1, wherein said thrust receiving mechanism is a ball coupling mechanism which supports a thrust load applied from said compression chamber to said end plate by a rolling ball.

12. A scroll type fluid machine comprising:
one scroll including a spiral wrap portion extending from a surface of an end plate;
the other scroll which is opposed to said one scroll, including a spiral wrap portion extending from a surface of an end plate, said wrap portion of said other scroll overlapping said wrap portion of said one scroll to define a compression chamber;
a thrust receiving mechanism which is provided on a back surface of at least one of said one scroll and said other scroll, which permits a gap in a thrust direction between said end plate and said wrap portion to vary by a predetermined amount and supports said end plate in the thrust direction;
a discharge port which is provided on a radially inner side of at least one of said one scroll and said other scroll, and which discharges compressed fluid which is compressed by the compression chamber;
a pressure keeping mechanism provided downstream of said discharge port, the pressure keeping mechanism increasing a pressure in said compression chamber right after operation starts so as to push said scroll on a side where said thrust receiving mechanism is provided at its back toward the thrust receiving mechanism; and
any one of a pneumatic device and a storage tank provided downstream of said pressure keeping mechanism, wherein
a flow path area of said pressure keeping mechanism is changed to at least two levels such that a small flow path area is set until a pressure upstream of said pressure keeping mechanism reaches a predetermined pressure after a compressing operation is started, and the flow path area is changed to a large flow path area when the pressure exceeds said predetermined pressure, said large flow path area having such a size that a pressure difference between upstream and downstream is reduced, and
a check valve which prevents compressed fluid from reversely flowing from any one of said pneumatic device and said storage tank is provided between said discharge port and said pressure keeping mechanism, or between said pressure keeping mechanism and any one of said pneumatic device and said storage tank.

13. A scroll type fluid machine according to claim 12, wherein said check valve is provided between said pressure keeping mechanism and said pneumatic device.

14. A scroll type fluid machine according to claim 12, wherein said pressure keeping mechanism is a pressure keeping valve whose opening degree is varied to keep a pressure upstream of said pressure keeping mechanism constant.

15. A scroll type fluid machine according to claim 12, wherein said thrust receiving mechanism is a ball coupling mechanism which supports a thrust load applied from said compression chamber to said end plate by a rolling ball.

16. An air suspension apparatus comprising:
one scroll including a spiral wrap portion extending from a surface of an end plate;
the other scroll which is opposed to said one scroll, including a spiral wrap portion extending from a surface of an end plate, said wrap portion of said other scroll overlapping said wrap portion of said one scroll to define a compression chamber;
a thrust receiving mechanism which is provided on a back surface of at least one of said one scroll and said other scroll, which permits a gap in a thrust direction between said end plate and said wrap portion to vary by a predetermined amount and supports said end plate in the thrust direction;
a discharge port which is provided on a radially inner side of at least one of said one scroll and said other scroll, and which discharges compressed fluid which is compressed by the compression chamber;
a pressure keeping mechanism provided downstream of said discharge port, the pressure keeping mechanism increasing a pressure in said compression chamber right after operation starts so as to push said scroll on a side where said thrust receiving mechanism is provided at its back toward the thrust receiving mechanism; and
an air suspension provided downstream of said pressure keeping mechanism with a dryer interposed therebetween, said dryer including moisture absorbent therein, wherein
a flow path area of said pressure keeping mechanism is changed at least in two stages such that a small flow path area is set until a pressure upstream of said pressure keeping mechanism reaches a predetermined pressure after a compressing operation is started, and the flow path area is changed to a large flow path area when the pressure exceeds said predetermined pressure, said large flow path area having such a size that a pressure difference between upstream and downstream is reduced, and
a check valve which prevents compressed fluid from reversely flowing from said air suspension is provided between said discharge port and said pressure keeping mechanism or downstream of said pressure keeping mechanism.

17. An air suspension apparatus according to claim 16, wherein said pressure keeping mechanism is a pressure keeping valve whose opening degree is changed such that the pressure upstream of said pressure keeping mechanism is kept constant.

18. An air suspension apparatus according to claim 16, wherein said pressure keeping mechanism is a solenoid valve which includes a small flow path switching section having a small flow path area and a large flow path switching section having a large flow path area.

19. An air suspension apparatus according to claim 16, wherein said check valve is a supply/discharge valve which supplies and discharges compressed fluid through said dryer.

* * * * *